US012652340B2

(12) United States Patent
Wang et al.

(10) Patent No.: US 12,652,340 B2
(45) Date of Patent: Jun. 9, 2026

(54) BLUETOOTH MESSAGE TRANSMISSION METHOD AND APPARATUS, AND BLUETOOTH NETWORK

(71) Applicant: Huawei Technologies Co., Ltd., Shenzhen (CN)

(72) Inventors: Yiming Wang, Dongguan (CN); Yong Luo, Dongguan (CN)

(73) Assignee: Huawei Technologies Co., Ltd., Shenzen (CN)

( * ) Notice: Subject to any disclaimer, the term of this patent is extended or adjusted under 35 U.S.C. 154(b) by 293 days.

(21) Appl. No.: 18/476,942

(22) Filed: Sep. 28, 2023

(65) Prior Publication Data

US 2024/0031456 A1     Jan. 25, 2024

Related U.S. Application Data

(63) Continuation of application No. PCT/CN2022/082276, filed on Mar. 22, 2022.

(30) Foreign Application Priority Data

Mar. 31, 2021     (CN) .......................... 202110351579.6

(51) Int. Cl.
*H04L 69/08*     (2022.01)
*H04W 4/80*     (2018.01)
*H04W 76/20*     (2018.01)

(52) U.S. Cl.
CPC .............. *H04L 69/08* (2013.01); *H04W 4/80* (2018.02); *H04W 76/20* (2018.02); *H04L 2212/00* (2013.01)

(58) Field of Classification Search
CPC .......... H04L 69/08; H04W 76/20; H04W 4/80
See application file for complete search history.

(56) References Cited

U.S. PATENT DOCUMENTS

| | | | | |
|---|---|---|---|---|
| 2009/0203316 A1* | 8/2009 | Krueger | ................. | H04W 4/18 |
| | | | | 455/41.2 |
| 2011/0312322 A1* | 12/2011 | Garrett | ................. | H04W 52/52 |
| | | | | 455/426.1 |
| 2015/0263880 A1* | 9/2015 | Wang | ...................... | H04W 4/70 |
| | | | | 370/329 |

(Continued)

FOREIGN PATENT DOCUMENTS

| | | |
|---|---|---|
| CN | 106160757 A | 11/2016 |
| TW | 201728100 A | 8/2017 |

*Primary Examiner* — David Bilodeau
(74) *Attorney, Agent, or Firm* — Slater Matsil, LLP

(57) ABSTRACT

In accordance with an embodiment, a method includes receiving, on a first Bluetooth link between a first gateway and a first Bluetooth device, a first Bluetooth message sent by the first Bluetooth device; encapsulating, using a transport protocol adapted to a non-Bluetooth link between the first gateway and a second gateway, the first Bluetooth message to obtain a second Bluetooth message; and sending the second Bluetooth message to the second gateway on the non-Bluetooth link, wherein the second gateway decapsulates the second Bluetooth message using the transport protocol to obtain the first Bluetooth message, and sends the first Bluetooth message to a second Bluetooth device on a second Bluetooth link with the second Bluetooth device, wherein the non-Bluetooth link is a wireless local area network link or a wired link.

20 Claims, 9 Drawing Sheets

(56) References Cited

U.S. PATENT DOCUMENTS

| | | | |
|---|---|---|---|
| 2016/0021684 A1* | 1/2016 | Lewis | H04W 4/80 |
| | | | 370/329 |
| 2017/0195318 A1 | 7/2017 | Liu et al. | |
| 2017/0201854 A1* | 7/2017 | Choi | H04W 4/80 |
| 2018/0152979 A1* | 5/2018 | Lee | H04W 8/005 |
| 2018/0213349 A1* | 7/2018 | Panje | H04L 12/283 |
| 2019/0150134 A1* | 5/2019 | Kakinada | H04W 16/14 |
| | | | 370/330 |
| 2020/0288540 A1* | 9/2020 | Chu | H04W 16/14 |
| 2021/0409923 A1* | 12/2021 | Kumar | H04L 12/4633 |
| 2021/0410116 A1* | 12/2021 | Zhang | H04W 24/02 |
| 2025/0150899 A1* | 5/2025 | Cao | H04L 69/08 |

* cited by examiner

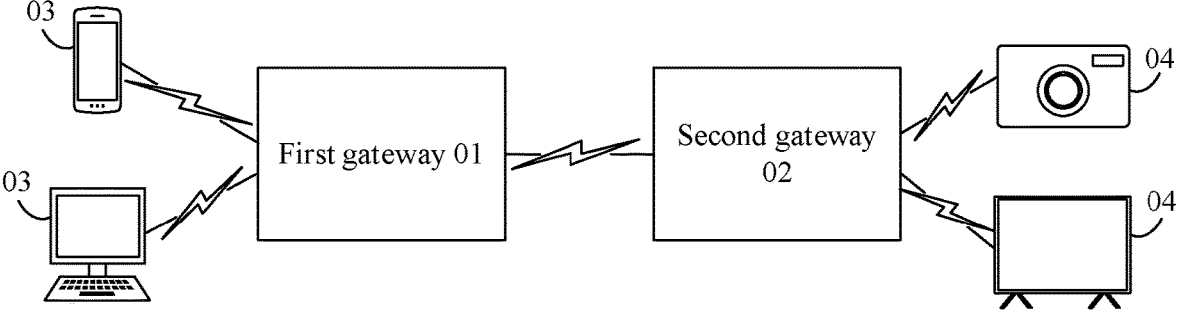

FIG. 1

```
┌─────────────────┐                          ┌─────────────────┐
│  First gateway  │                          │     Second      │
│                 │                          │     gateway     │
└─────────────────┘                          └─────────────────┘
         │                                             │
┌──────────────────────────────┐                      │
│ 101: Select a first Bluetooth │                      │
│ broadcast channel as a        │                      │
│ Bluetooth broadcast channel,  │                      │
│ and select a first Bluetooth  │                      │
│ data channel as a Bluetooth   │                      │
│ data channel                  │                      │
└──────────────────────────────┘                      │
         │                                             │
         │  ┌────────────────────────────┐            │
         │  │ 102: Send a Bluetooth       │            │
         │  │ channel allocation          │───────────▶│
         │  │ instruction on a non-       │            │
         │  │ Bluetooth link with the     │            │
         │  │ second gateway              │            │
         │  └────────────────────────────┘            │
         │                                             │
         │        ┌──────────────────────────────────────────┐
         │        │ 103: After receiving the Bluetooth channel │
         │        │ allocation instruction, use a second       │
         │        │ Bluetooth broadcast channel and a second   │
         │        │ Bluetooth data channel that are indicated  │
         │        │ in the Bluetooth channel allocation        │
         │        │ instruction as a Bluetooth broadcast       │
         │        │ channel and a Bluetooth data channel of    │
         │        │ the second gateway respectively            │
         │        └──────────────────────────────────────────┘
         │                                             │
         ┴                                             ┴
```

FIG. 2

BLUETOOTH MESSAGE TRANSMISSION METHOD AND APPARATUS, AND BLUETOOTH NETWORK

CROSS-REFERENCE TO RELATED APPLICATIONS

This application is a continuation of International Application No. PCT/CN2022/082276, filed on Mar. 22, 2022, which claims priority to Chinese Patent Application No. 202110351579.6, filed on Mar. 31, 2021. The disclosures of the aforementioned applications are hereby incorporated by reference in their entireties.

TECHNICAL FIELD

This application relates to the communication field, and in particular, to a Bluetooth message transmission method and apparatus, and a Bluetooth network.

BACKGROUND

Bluetooth is a low-cost short-range wireless communication technology, and can enable a device to communicate, with low power consumption, with another device.

However, because a maximum transmission distance of a Bluetooth message is short (generally about 10 meters), a distance between two devices that perform Bluetooth-based communication cannot exceed the maximum transmission distance, resulting in poor flexibility of transmission of the Bluetooth message.

SUMMARY

This application provides a Bluetooth message transmission method and apparatus, and a Bluetooth network, to resolve a technical problem of poor flexibility of transmission of a Bluetooth message. Technical solutions are as follows.

According to an aspect, a Bluetooth message transmission method is provided, and is applied to a first gateway. The method includes: receiving, on a first Bluetooth link with a first Bluetooth device, a first Bluetooth message sent by the first Bluetooth device; then encapsulating, by using a transport protocol adapted to a non-Bluetooth link between the first gateway and a second gateway, the first Bluetooth message to obtain a second Bluetooth message; and then sending the second Bluetooth message to the second gateway on the non-Bluetooth link. The second gateway decapsulates the second Bluetooth message by using the transport protocol, to obtain the first Bluetooth message, and sends the first Bluetooth message to a second Bluetooth device on a second Bluetooth link with the second Bluetooth device. The non-Bluetooth link is a wireless local area network link or a wired link.

Because the first Bluetooth device may transmit a Bluetooth message to the second Bluetooth device on the non-Bluetooth link between the two gateways, a transmission distance of the Bluetooth message is effectively increased, and flexibility of transmission of the Bluetooth message is improved.

Optionally, the method may further include: selecting a first Bluetooth broadcast channel as a Bluetooth broadcast channel of the first gateway, selecting a first Bluetooth data channel as a Bluetooth data channel of the first gateway, and sending a Bluetooth channel allocation instruction to the second gateway on the non-Bluetooth link. The Bluetooth channel allocation instruction indicates the second gateway to select a second Bluetooth broadcast channel as a Bluetooth broadcast channel of the second gateway, and select a second Bluetooth data channel as a Bluetooth data channel of the second gateway.

The first gateway may allocate different Bluetooth broadcast channels and different Bluetooth data channels to the first gateway and the second gateway, so that co-channel interference between gateways can be effectively avoided, and then transmission quality of a Bluetooth message can be effectively improved.

Optionally, the first Bluetooth message may include service data.

The first Bluetooth message may be a message sent by the first Bluetooth device after a Bluetooth connection to the second Bluetooth device is established on the non-Bluetooth link. The first Bluetooth message carries the service data, so that the first Bluetooth device can exchange the service data with the second Bluetooth device on the non-Bluetooth link.

Optionally, the first Bluetooth message may include first attribute information, and the first attribute information indicates that the first Bluetooth device supports transmission of the Bluetooth message on the non-Bluetooth link.

The first Bluetooth message carries the first attribute information, so that the first gateway can determine whether the first Bluetooth device supports the transmission of the Bluetooth message on the non-Bluetooth link, and then determine whether the first Bluetooth message needs to be transmitted on the non-Bluetooth link. The first Bluetooth message may be a message sent by the first Bluetooth device in a device discovery stage. For example, the first Bluetooth message may be a broadcast message.

Optionally, the method may further include: sending a first request to the first Bluetooth device at each connection interval on the first Bluetooth link, and sending, to the second gateway at each connection interval on the non-Bluetooth link, a second request obtained through encapsulation by using the transport protocol. The first request indicates the first Bluetooth device to feed back a first response on the first Bluetooth link, and the second request is sent to the second Bluetooth device on the second Bluetooth link after been decapsulated by the second gateway, and indicates the second Bluetooth device to feed back a second response on the second Bluetooth link.

The first gateway may send the first request and the second request to perform connection management on a Bluetooth connection between the gateway and a Bluetooth device, or a Bluetooth connection between two Bluetooth devices.

Optionally, the first Bluetooth message may further include second attribute information, and the second attribute information may indicate that the Bluetooth device supports performing connection management on a Bluetooth connection on the non-Bluetooth link. The first gateway may send, to the first Bluetooth device based on an indication of the second attribute information in the first Bluetooth message, the first request at each connection interval on the first Bluetooth link. The method may further include: receiving, on the non-Bluetooth link with the second gateway, a third Bluetooth message sent by the second gateway, where the third Bluetooth message is obtained by encapsulating, by the second gateway, by using the transport protocol, a fourth Bluetooth message received on the second Bluetooth link, and the fourth Bluetooth message includes the second attribute information; then decapsulating, by using the transport protocol, the third Bluetooth message to obtain the fourth Bluetooth message, and sending, to the second gateway based on the indication of the second attribute information in the fourth Bluetooth message, at each connection interval on the non-Bluetooth link, the second request obtained through encapsulation by using the transport protocol.

After determining, based on the second attribute information, that the Bluetooth device supports performing connection management on the Bluetooth connection on the non-Bluetooth link, the first gateway separately sends the first request and the second request to the two Bluetooth devices, to avoid a waste of transmission resources and processing resources caused by performing connection management on a Bluetooth device that does not have the foregoing capability.

Optionally, the method may further include: obtaining first Bluetooth signal strength between the first Bluetooth device and the first gateway and second Bluetooth signal strength between the first Bluetooth device and the second gateway on the first Bluetooth link after the Bluetooth connection to the first Bluetooth device is established; and sending a roaming instruction to the first Bluetooth device on the first Bluetooth link if the second Bluetooth signal strength is greater than the first Bluetooth signal strength. The roaming instruction indicates the first Bluetooth device to establish the Bluetooth connection to the second gateway.

The first gateway controls, based on Bluetooth signal strength, roaming of the Bluetooth device, and it can be ensured that the Bluetooth device can establish the Bluetooth connection to a gateway having high Bluetooth signal strength, and then the transmission quality of the Bluetooth message is effectively ensured.

Optionally, the first Bluetooth message may further include third attribute information, and the third attribute information indicates that the first Bluetooth device supports roaming between different gateways. The first gateway may obtain, based on an indication of the third attribute information in the first Bluetooth message, the first Bluetooth signal strength between the first Bluetooth device and the first gateway and the second Bluetooth signal strength between the first Bluetooth device and the second gateway on the first Bluetooth link after the Bluetooth connection to the first Bluetooth device is established.

After determining that the Bluetooth device supports the roaming between the different gateways, the first gateway obtains Bluetooth signal strength between the Bluetooth device and each gateway, to avoid a waste of the transmission resources caused by obtaining Bluetooth signal strength of the Bluetooth device that does not have the foregoing capability.

According to another aspect, a Bluetooth message transmission method is provided. The method may be applied to a second gateway. The method includes: receiving, on a non-Bluetooth link with a first gateway, a second Bluetooth message sent by the first gateway, where the second Bluetooth message is obtained by encapsulating, by the first gateway, by using a transport protocol adapted to the non-Bluetooth link, a first Bluetooth message received on a first Bluetooth link with a first Bluetooth device, where the non-Bluetooth link is a wireless local area network link or a wired link; decapsulating, by using the transport protocol, the second Bluetooth message to obtain the first Bluetooth message; and sending the first Bluetooth message to a second Bluetooth device on a second Bluetooth link with the second Bluetooth device.

Optionally, the method may further include: receiving, on the non-Bluetooth link, a Bluetooth channel allocation instruction sent by the first gateway, and using a second Bluetooth broadcast channel and a second Bluetooth data channel that are indicated in the Bluetooth channel allocation instruction as a Bluetooth broadcast channel and a Bluetooth data channel of the second gateway respectively.

Optionally, the method may further include: receiving, on the second Bluetooth link, a fourth Bluetooth message sent by the second Bluetooth device; encapsulating, by using the transport protocol, the fourth Bluetooth message to obtain a third Bluetooth message; and sending the third Bluetooth message to the first gateway on the non-Bluetooth link. The first gateway decapsulates the third Bluetooth message by using the transport protocol, to obtain the fourth Bluetooth message, and sends the third Bluetooth message to the first Bluetooth device on the first Bluetooth link.

According to still another aspect, a first gateway is provided. The first gateway includes at least one functional module, and the at least one functional module may be configured to implement the Bluetooth message transmission method that is applied to the first gateway and that is provided in the foregoing aspects.

According to yet another aspect, a second gateway is provided. The second gateway includes at least one functional module, and the at least one functional module may be configured to implement the Bluetooth message transmission method that is applied to the second gateway and that is provided in the foregoing aspects.

According to still yet another aspect, a gateway is provided. The gateway includes a memory, a processor, and a computer program that is stored in the memory and that is capable of being run on the processor, and when executing the computer program, the processor implements the Bluetooth message transmission method that is applied to the first gateway or the second gateway and that is provided in the foregoing aspects.

According to a further aspect, a computer-readable storage medium is provided. The computer-readable storage medium stores instructions, and the instructions may be executed by a processor to implement the Bluetooth message transmission method that is applied to the first gateway or the second gateway and that is provided in the foregoing aspects.

According to a still further aspect, a computer program product including instructions is provided, and when the computer program product runs on a computer, the computer is enabled to perform the Bluetooth message transmission method that is applied to the first gateway or the second gateway and that is provided in the foregoing aspects.

According to a yet further aspect, a Bluetooth network is provided. The Bluetooth network includes a first Bluetooth device, the first gateway provided in the foregoing aspects, the second gateway provided in the foregoing aspects, and a second Bluetooth device. A first Bluetooth link exists between the first Bluetooth device and the first gateway, a second Bluetooth link exists between the second Bluetooth device and the second gateway, and a non-Bluetooth link exists between the first gateway and the second gateway. The non-Bluetooth link is a wireless local area network link or a wired link.

Technical effects obtained by the Bluetooth message transmission method applied to the second gateway, the first gateway, the second gateway, the computer-readable storage medium, the computer program product, and the Bluetooth network that are provided in the foregoing aspects are similar to technical effects obtained by corresponding technical means in the Bluetooth message transmission method that is applied to the first gateway and that is provided in the foregoing aspects. Details are not described herein again.

BRIEF DESCRIPTION OF THE DRAWINGS

FIG. 1 is a schematic diagram of a structure of a Bluetooth network according to an embodiment of this application;

FIG. 2 is a flowchart of a Bluetooth channel allocation method according to an embodiment of this application;

DETAILED DESCRIPTION OF ILLUSTRATIVE EMBODIMENTS

Figure 3:
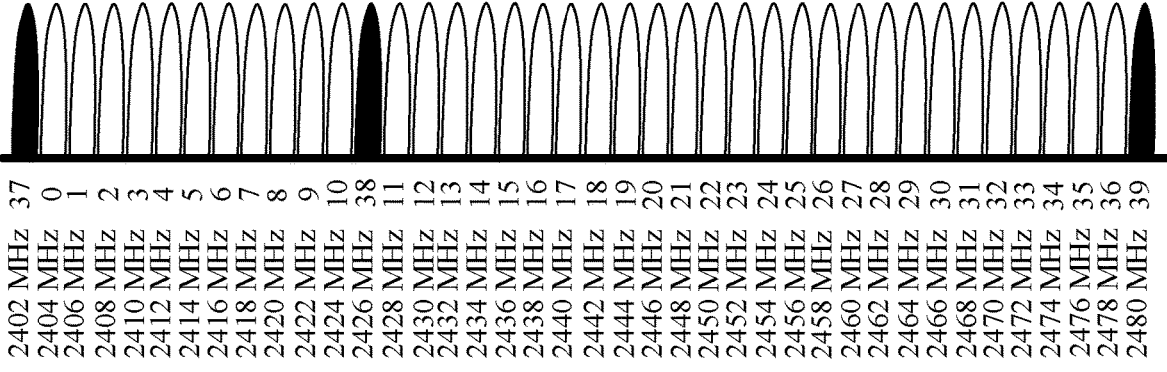
FIG. 3 is a schematic diagram of channel division in a 2.4 GHz frequency band.

The following describes, with reference to the accompanying drawings, the solutions provided in embodiments of this application.

FIG. 1 is a schematic diagram of a structure of a Bluetooth network according to an embodiment of this application. As shown in FIG. 1, the Bluetooth network may include a first gateway 01, a second gateway 02, a first Bluetooth device 03, and a second Bluetooth device 04. Both the first gateway 01 and the second gateway 02 include a module (not shown in the figure) responsible for Bluetooth communication. A first Bluetooth link exists between the first Bluetooth device 03 and the first gateway 01, a second Bluetooth link exists between the second Bluetooth device 04 and the second gateway 02, and a non-Bluetooth link exists between the first gateway 01 and the second gateway 02. The non-Bluetooth link is a wireless local area network (WLAN) link or a wired link. The WLAN link may be a wireless fidelity (Wi-Fi) link, and the wired link may be a power line communication link, a network cable communication link, a coaxial cable communication link, or the like.

It may be further learned from FIG. 1 that the Bluetooth network may include one or more first Bluetooth devices 03, and may include one or more second Bluetooth devices 04. For example, FIG. 1 shows two first Bluetooth devices 03 and two second Bluetooth devices 04. The first Bluetooth device 03 and the second Bluetooth device 04 may be a mobile phone, a computer, a camera, a wearable device, a smart home device, or the like. The wearable device may include a watch, a band, a headset, a virtual reality device (VR), and the like. The smart home device may include a sound box, a television, an air conditioner, a desk lamp, a socket, and the like.

It may be understood that the Bluetooth network according to an embodiment of this application may be applied to Internet of Things (IoT). Correspondingly, both the first Bluetooth device 03 and the second Bluetooth device 04 may be Bluetooth IoT devices.

Each gateway in the first gateway 01 and the second gateway 02 may include two communication modules. One communication module is a Bluetooth communication module, and the other communication module is a non-Bluetooth communication module. The Bluetooth communication module is configured to communicate with a Bluetooth device on a Bluetooth link, and the non-Bluetooth communication module is configured to communicate with a non-Bluetooth communication module in another gateway on a non-Bluetooth link. That is, both the first gateway 01 and the second gateway 02 support Bluetooth communication and non-Bluetooth link-based communication. Because a gateway in the Bluetooth network according to an embodiment of this application further supports the non-Bluetooth link-based communication, the Bluetooth network may also be referred to as a heterogeneous Bluetooth network.

For example, the Bluetooth communication module may be a Bluetooth low energy (LE) module, or the Bluetooth communication module may be a basic rate/enhanced data rate (BR/EDR) Bluetooth communication module. The another communication module may be a Wi-Fi module that supports a WLAN.

In embodiments of this application, the first gateway 01 may be a device such as an optical network terminal (ONT), a router, or a home terminal (for example, a Bluetooth speaker, a mobile phone, or a computer), and the first gateway 01 may be referred to as a master gateway. The second gateway 02 may be a device such as a wireless access point (AP) or a home terminal, and the second gateway 02 may be referred to as a standby gateway. The AP may be a router or a switch.

Optionally, as shown in FIG. 1, the first gateway 01 and the second gateway 02 may be two gateways independent of each other. Alternatively, the first gateway 01 and the second gateway 02 may be integrated into one device. A manner of setting the two gateways is not limited in embodiments of this application.

Optionally, the Bluetooth network according to an embodiment of this application may be a Bluetooth mesh network. Different from a one-to-one or one-to-many communication manner in a conventional Bluetooth protocol, the Bluetooth mesh network implements many-to-many communication of the Bluetooth devices. Correspondingly, the first gateway 01 may be a proxy node in the Bluetooth mesh network, and the second gateway 02 may be a relay node in the Bluetooth mesh network.

The proxy node can enable a Bluetooth device that does not have a Bluetooth mesh technology to communicate with a node in the Bluetooth mesh network. The relay node can transmit a message received by the relay node, that is, the relay node may be configured to forward the message.

FIG. 2 is a flowchart of a Bluetooth channel allocation method according to an embodiment of this application. The method may be applied to the Bluetooth network provided in the foregoing embodiment. Referring to FIG. 2, the method may include the following steps.

Step 101: A first gateway selects a first Bluetooth broadcast channel as a Bluetooth broadcast channel, and selects a first Bluetooth data channel as a Bluetooth data channel.

In this embodiment of this application, the first gateway serves as a master gateway, and may select the first Bluetooth broadcast channel from a plurality of Bluetooth broadcast channels as the Bluetooth broadcast channel of the first gateway, and may select the first Bluetooth data channel from a plurality of Bluetooth data channels as the Bluetooth data channel of the first gateway.

For example, FIG. 3 is a schematic diagram of channel division in a 2.4 GHz frequency band. As shown in FIG. 3, a frequency range of the 2.4 GHz frequency band is from 2402 megahertz (MHz) to 2480 MHz, and the 2.4 GHz frequency band may be divided into 40 Bluetooth channels. The 40 Bluetooth channels include three Bluetooth broadcast channels (also referred to as hybrid channels) and 37 Bluetooth data channels. Numbers of the Bluetooth broadcast channel are 37, 38, and 39, and the Bluetooth broadcast channel is used for scanning devices initiating a connection, and broadcasting data. Numbers of the Bluetooth data channels are 0 to 36, and the Bluetooth data channel is used for two devices that have established a Bluetooth connection to exchange data. The first gateway may select one of the three Bluetooth broadcast channels as the Bluetooth broadcast channel of the first gateway, and may select one or more of the 37 Bluetooth data channels as the Bluetooth data channel of the first gateway.

Step 102: The first gateway sends a Bluetooth channel allocation instruction to a second gateway on a non-Bluetooth link with the second gateway.

In this embodiment of this application, to avoid co-channel interference caused by channel overlapping, the first gateway may allocate a Bluetooth broadcast channel different from that of the first gateway and a Bluetooth data channel different from that of the first gateway to the second gateway. Specifically, after the first gateway completes channel selection of the first gateway, to be specific, after the first gateway selects the first Bluetooth broadcast channel from the plurality of Bluetooth broadcast channels as the Bluetooth broadcast channel of the first gateway, and selects the first Bluetooth data channel as the Bluetooth data channel of the first gateway, the first gateway sends the Bluetooth channel allocation instruction to the second gateway on the non-Bluetooth link with the second gateway. The non-Bluetooth link may be a Wi-Fi link, a power line communication link, a network cable communication link, a coaxial cable communication link, or the like. The Bluetooth channel allocation instruction is obtained through encapsulation by using a transport protocol adapted to the non-Bluetooth link.

The Bluetooth channel allocation instruction indicates the second gateway to use a second Bluetooth broadcast channel from the plurality of Bluetooth broadcast channels as a Bluetooth broadcast channel of the second gateway, and use a second Bluetooth data channel from the plurality of Bluetooth data channels as a Bluetooth data channel of the second gateway. It may be understood that the second Bluetooth broadcast channel is different from the first Bluetooth broadcast channel, and the second Bluetooth data channel is different from the first Bluetooth data channel.

Step 103: After receiving the Bluetooth channel allocation instruction, the second gateway uses the second Bluetooth broadcast channel and the second Bluetooth data channel that are indicated in the Bluetooth channel allocation instruction as the Bluetooth broadcast channel and the Bluetooth data channel of the second gateway respectively.

After receiving, on the non-Bluetooth link with the first gateway, the Bluetooth channel allocation instruction sent by the first gateway, the second gateway may select, based on an indication of the Bluetooth channel allocation instruction, the second Bluetooth broadcast channel as the Bluetooth broadcast channel of the second gateway, and select the second Bluetooth data channel as the Bluetooth data channel of the second gateway. Because both the Bluetooth broadcast channel and the Bluetooth data channel of the second gateway are different from those of the first gateway, co-channel interference between the two gateways can be effectively avoided.

Optionally, the Bluetooth channel allocation instruction may carry a number of the second Bluetooth broadcast channel and a number of the second Bluetooth data channel, and the second gateway may determine, based on the number of the Bluetooth channel carried in the Bluetooth channel allocation instruction, a Bluetooth channel that the second gateway needs to use.

Figure 5:
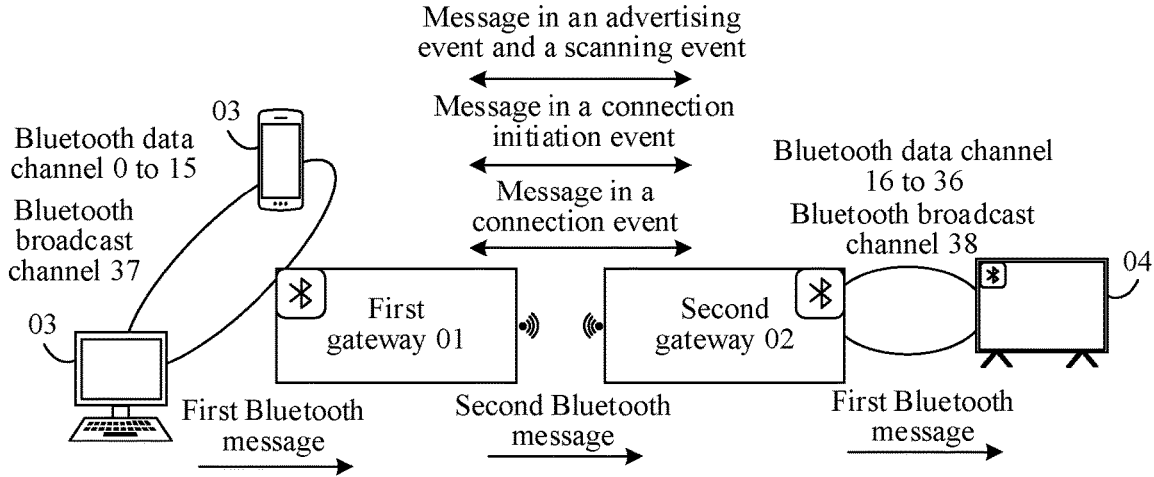
FIG. 5 is a schematic diagram of a structure of another Bluetooth network according to an embodiment of this application.

For example, referring to FIG. 5, a number of the first Bluetooth broadcast channel allocated to a first gateway 01 may be 37, and a number range of the first Bluetooth data channel may be from 0 to 15. A number of the second Bluetooth broadcast channel allocated by the first gateway 01 to a second gateway 02 may be 38, and a number range of the second Bluetooth data channel may be from 16 to 36.

It may be understood that, because there are a large quantity of available Bluetooth data channels in the Bluetooth network, the first gateway may select at least one first Bluetooth data channel as the Bluetooth data channel of the first gateway, and may indicate, according to the Bluetooth channel allocation instruction, the second gateway to select at least one second Bluetooth data channel as the Bluetooth data channel of the second gateway.

It may be further understood that after step 101, the first gateway may broadcast a Bluetooth message through the first Bluetooth broadcast channel, and may negotiate, with a first Bluetooth device through the first Bluetooth broadcast channel, the first Bluetooth data channel that is used to transmit service data and that is from the at least one first Bluetooth data channel. Similarly, after step 103, the second gateway may broadcast a Bluetooth message through the second Bluetooth broadcast channel, and may negotiate, with a second Bluetooth device through the second Bluetooth broadcast channel, the second Bluetooth data channel that is used to transmit the service data and that is from the at least one second Bluetooth data channel.

It can be learned from step 101 to step 103 that the first gateway may allocate a Bluetooth broadcast channel different from that of the first gateway and a Bluetooth data channel different from that of the first gateway to the second gateway. Therefore, co-channel interference between the two gateways can be effectively avoided.

Figure 4:
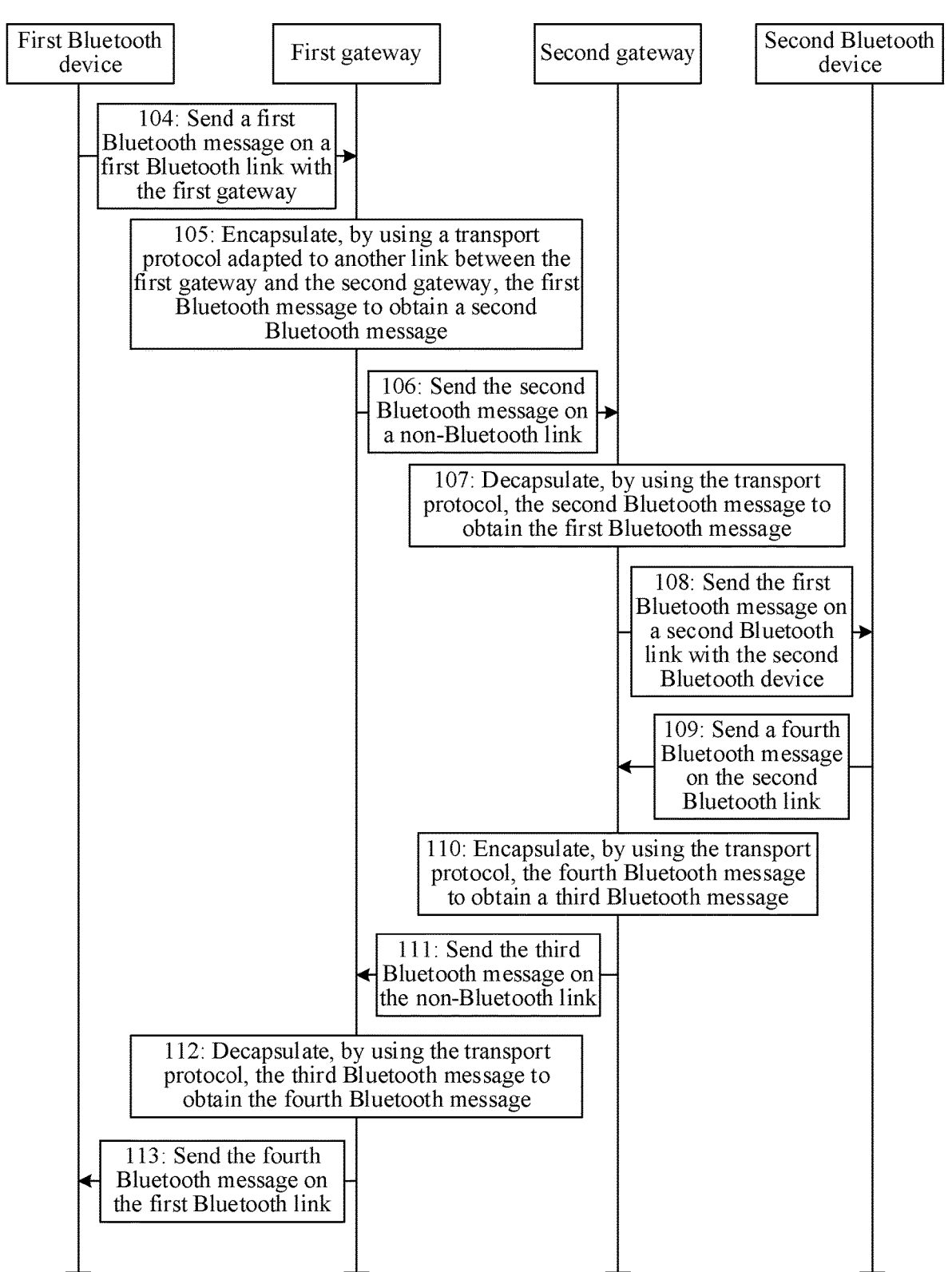
FIG. 4 is a flowchart of a Bluetooth message transmission method according to an embodiment of this application.

After the foregoing Bluetooth channel allocation is completed, the first Bluetooth device may communicate with a Bluetooth device in the second gateway through the first gateway and the second gateway. FIG. 4 is a flowchart of a Bluetooth message transmission method according to an embodiment of this application. The method may be applied to the Bluetooth network provided in the foregoing embodiment. Referring to FIG. 4, the method may include the following steps.

Step 104: A first Bluetooth device sends a first Bluetooth message to a first gateway on a first Bluetooth link with the first gateway.

Because the first gateway includes a Bluetooth communication module, the first Bluetooth link may exist between the first Bluetooth device and the Bluetooth communication module, and the first Bluetooth device may send the first Bluetooth message on the first Bluetooth link. The first Bluetooth link may be a Bluetooth radio-frequency link. It may be understood that the first Bluetooth message may be any type of a message defined in a Bluetooth protocol.

For example, referring to FIG. 5, the first Bluetooth message may be any one of the following messages: a broadcast message in an advertising event, a scanning request message and a scanning response message in a scanning event, a connection request message in a connection initiation event, or a message in a connection event. The message in the connection event may include a Bluetooth message used to exchange service data, and may further include a Bluetooth message used to keep a Bluetooth connection (also referred to as keepalive). The Bluetooth message used for keepalive may not include the service data. Because the advertising event and the scanning event are used to discover a Bluetooth device, an execution process of the two events may also be referred to as a device discovery stage.

It can be learned from the foregoing analysis that the first Bluetooth device may discover another Bluetooth device on the non-Bluetooth link, establish the Bluetooth connection to the another Bluetooth device, and exchange the service data with the another Bluetooth device.

Step 105: The first gateway encapsulates, by using a transport protocol adapted to the non-Bluetooth link between the first gateway and a second gateway, the first Bluetooth message to obtain a second Bluetooth message.

The first gateway is connected to the second gateway on the non-Bluetooth link, and the non-Bluetooth link is different from a Bluetooth link. Therefore, the first gateway cannot directly transmit a Bluetooth message on the non-Bluetooth link. Therefore, in step 105, after receiving the first Bluetooth message on the first Bluetooth link, the first gateway may encapsulate, by using the transport protocol adapted to the non-Bluetooth link, the first Bluetooth message to obtain the second Bluetooth message.

Figure 6:
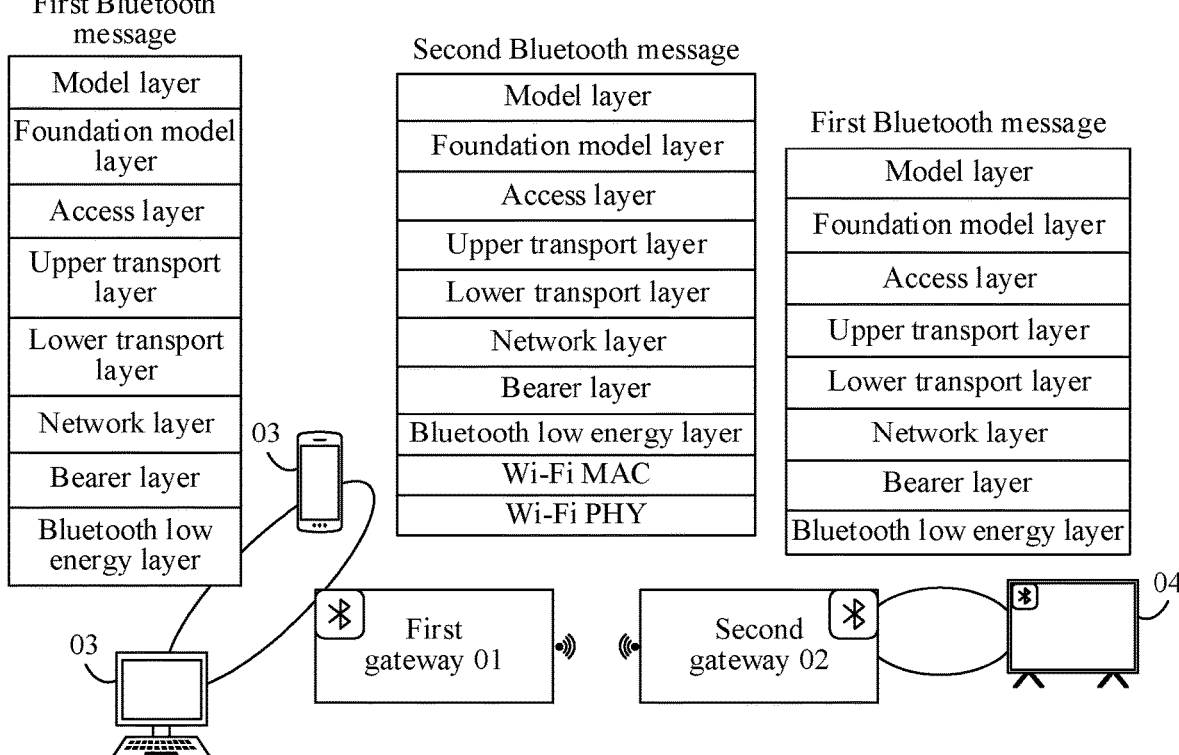
FIG. 6 is a schematic diagram of a Bluetooth message transmission process according to an embodiment of this application.

For example, it is assumed that the Bluetooth network is a Bluetooth mesh network, and the non-Bluetooth link is a Wi-Fi link. As shown in FIG. 6, the first Bluetooth message is obtained through encapsulation by using a Bluetooth mesh protocol, and a Bluetooth mesh protocol stack includes: a Bluetooth low energy layer, a bearer layer, a network layer, a lower transport layer, an upper transport layer, an access layer, a foundation model layer, and a model layer.

To transmit the first Bluetooth message on the Wi-Fi link, a first gateway 01 may encapsulate, by using a transport protocol adapted to the Wi-Fi link, the first Bluetooth message to obtain the second Bluetooth message. Referring to FIG. 6, it can be learned that the transport protocol adapted to the Wi-Fi link includes at least a media access control (MAC) layer protocol and a physical layer (PHY) protocol of the Wi-Fi link.

In a possible example, a Bluetooth message (for example, the broadcast message, the scanning request message, or the scanning response message) sent by a Bluetooth device and a gateway in the Bluetooth network in the device discovery stage may include first attribute information. The first attribute information may indicate that a device sending the Bluetooth message supports transmission of the Bluetooth message on the non-Bluetooth link.

Correspondingly, in a scenario in which the first Bluetooth message is a Bluetooth message sent by the first Bluetooth device in the device discovery stage, the first Bluetooth message may include the first attribute information. After receiving the first Bluetooth message, the first gateway may determine, based on the first attribute information, that the first Bluetooth device supports the transmission of the Bluetooth message on the non-Bluetooth link. In this way, the first gateway may encapsulate, by using the transport protocol adapted to the non-Bluetooth link, the first Bluetooth message to obtain the second Bluetooth message.

If the first gateway receives the Bluetooth message sent by the Bluetooth device in the device discovery stage, and the Bluetooth message does not carry the first attribute information, the first gateway may determine that the Bluetooth device sending the Bluetooth message does not support the transmission of the Bluetooth message on the non-Bluetooth link, and then does not need to send the Bluetooth message to the second gateway on the non-Bluetooth link. That is, step 105 does not need to be performed.

It may be understood that, in the foregoing example, the Bluetooth device and the gateway in the Bluetooth network may include the first attribute information only in the Bluetooth message sent in the device discovery stage, and does not need to include the first attribute information in a message sent in a subsequent connection initiation event and a message sent in the connection event.

In another possible example, the Bluetooth message sent by the Bluetooth device and the gateway in the Bluetooth network in the device discovery stage may alternatively not need to include the first attribute information. Correspondingly, if the first Bluetooth message sent by the first Bluetooth device is the broadcast message, the first gateway may directly perform step 105. If the first Bluetooth message sent by the first Bluetooth device is a Bluetooth message of a type other than the broadcast message, the first gateway may determine a receiver of the first Bluetooth message based on an address field in the first Bluetooth message. If the receiver of the first Bluetooth message is a second Bluetooth device connected to the second gateway, the first gateway may determine that the first Bluetooth message needs to be transmitted on the non-Bluetooth link, and may further perform step 105.

It may be further understood that because the first gateway also includes the Bluetooth communication module, in a scenario in which the first Bluetooth message is the broadcast message, the first gateway may further respond to the broadcast message on the first Bluetooth link (for example, may send the connection request message or the scanning request message to the first Bluetooth device), to establish the Bluetooth connection to the first Bluetooth device.

Step 106: The first gateway sends the second Bluetooth message to the second gateway on the non-Bluetooth link.

Because the second Bluetooth message is obtained through encapsulation by using the transport protocol adapted to the non-Bluetooth link, the first gateway may transmit the second Bluetooth message to the second gateway on the non-Bluetooth link. Because the first gateway can transmit the Bluetooth message on the non-Bluetooth link different from the Bluetooth link, a transmission distance of the Bluetooth message is effectively increased. For example, based on the method shown in step 104 to step 106, that the transmission distance of the Bluetooth message is far greater than 10 meters may be ensured.

In a scenario in which the non-Bluetooth link is the Wi-Fi link, because bandwidth of the Wi-Fi link is high, a transmission rate of the Bluetooth message can be effectively increased, a throughput of the Bluetooth message can be improved, and transmission latency of the Bluetooth message can be reduced.

Step 107: The second gateway decapsulates, by using the transport protocol, the second Bluetooth message to obtain the first Bluetooth message.

After receiving, on the non-Bluetooth link, the second Bluetooth message sent by the first gateway, the second gateway may decapsulate, by using the transport protocol adapted to the non-Bluetooth link, the second Bluetooth message to obtain the first Bluetooth message.

For example, referring to FIG. 6, a second gateway 02 may decapsulate, by using the transport protocol adapted to the Wi-Fi link, the second Bluetooth message to obtain the first Bluetooth message encapsulated based on the Bluetooth mesh protocol.

Step 108: The second gateway sends the first Bluetooth message to the second Bluetooth device on a second Bluetooth link with the second Bluetooth device.

Because the first Bluetooth message obtained by decapsulating the second Bluetooth message by the second gateway is encapsulated based on the Bluetooth protocol, the second gateway may directly send the first Bluetooth message to the second Bluetooth device on the second Bluetooth link. As described in step 104, the first Bluetooth message may be the broadcast message, the scanning request message, the scanning response message, the connection request message, or the message in the connection event. The following describes operations performed by the second Bluetooth device when the first Bluetooth message is different types of messages.

1. If the first Bluetooth message is the broadcast message, the second Bluetooth device may send the connection request message to the first Bluetooth device through the second gateway and the first gateway, to establish the Bluetooth connection to the first Bluetooth device. Alternatively, the second Bluetooth device may send the scanning request message to the first Bluetooth device, to obtain a related parameter of the first Bluetooth device.
2. If the first Bluetooth message is the scanning request message, the second Bluetooth device may send the scanning response message to the first Bluetooth device through the second gateway and the first gateway, to send a related parameter of the second Bluetooth device to the first Bluetooth device.
3. If the first Bluetooth message is the scanning response message or a message in the connection event that carries the service data, the second Bluetooth device may obtain data in the first Bluetooth message.
4. If the first Bluetooth message is the connection request message, the second Bluetooth device may establish the Bluetooth connection to the first Bluetooth device.
5. If the first Bluetooth message is a message in the connection event that is used to request the service data, the second Bluetooth device may ignore the first Bluetooth message, or may send a response to the first Bluetooth device through the second gateway and the first gateway. The response may carry the service data, or may not carry the service data.

It may be understood that the second Bluetooth link may include a second Bluetooth broadcast channel and a second Bluetooth data channel. The second gateway may send the broadcast message, the scanning request message, the scanning response message, and the connection request message through the second Bluetooth broadcast channel. In addition, the second gateway may send the message in the connection event through the second Bluetooth data channel.

It can be learned from step 104 to step 108 that, the first Bluetooth device may transmit the first Bluetooth message to the second Bluetooth device on the non-Bluetooth link between the first gateway and the second gateway. This effectively increases a transmission distance of the first Bluetooth message, improves flexibility of transmitting the Bluetooth message by the first Bluetooth device to the second Bluetooth device, and further improves flexibility of Bluetooth network networking.

The Bluetooth message transmission method may further include a process in which the second Bluetooth device transmits the second Bluetooth message to the first Bluetooth device. Still referring to FIG. 4, the process may further include the following steps.

Step 109: The second Bluetooth device sends a fourth Bluetooth message to the second gateway on the second Bluetooth link.

The second Bluetooth link exists between the second Bluetooth device and the second gateway, and the second Bluetooth device may send the fourth Bluetooth message to the second gateway on the second Bluetooth link. It may be understood that the fourth Bluetooth message may be any one of the following messages: the broadcast message in the advertising event, the scanning request message and the scanning response message in the scanning event, the connection request message in the connection initiation event, and the message in the connection event.

Step 110: The second gateway encapsulates, by using the transport protocol, the fourth Bluetooth message to obtain a third Bluetooth message.

After receiving the fourth Bluetooth message on the second Bluetooth link, the second gateway may encapsulate, by using the transport protocol adapted to the non-Bluetooth link, the fourth Bluetooth message to obtain the third Bluetooth message. For an implementation process of step 110, refer to related descriptions of step 105. Details are not described herein again.

Step 111: The second gateway sends the third Bluetooth message to the first gateway on the non-Bluetooth link.

Because the third Bluetooth message is obtained through encapsulation by using the transport protocol adapted to the non-Bluetooth link, the second gateway may transmit the third Bluetooth message to the first gateway on the non-Bluetooth link. For an implementation process of step 111, refer to related descriptions of step 106. Details are not described herein again.

Step 112: The first gateway decapsulates, by using the transport protocol, the third Bluetooth message to obtain the fourth Bluetooth message.

After receiving, on the non-Bluetooth link, the third Bluetooth message sent by the second gateway, the first gateway may decapsulate, by using the transport protocol adapted to the non-Bluetooth link, the third Bluetooth message to obtain the fourth Bluetooth message. For an implementation process of step 112, refer to related descriptions of step 107. Details are not described herein again.

Step 113: The first gateway sends the fourth Bluetooth message to the first Bluetooth device on the first Bluetooth link.

Because the fourth Bluetooth message obtained through decapsulation by the first gateway is encapsulated based on the Bluetooth protocol, the first gateway may send the fourth Bluetooth message to the first Bluetooth device on the first Bluetooth link. For an implementation process of step 113 and operations performed after the first Bluetooth device receives the fourth Bluetooth message, refer to related descriptions of step 108. Details are not described herein again.

The foregoing step 104 to step 113 are described by using an example in which the Bluetooth message is forwarded through the first gateway and the second gateway. It may be understood that at least one another gateway may be further connected between the first gateway and the second gateway, and a non-Bluetooth link exists between two adjacent gateways. Correspondingly, the first gateway may transmit the first Bluetooth message to the second gateway through the at least one another gateway, and the second gateway may also transmit the second Bluetooth message to the first gateway through the at least one another gateway. That is, a Bluetooth message sent by one Bluetooth device may be forwarded to another Bluetooth device through at least two gateways.

It can be learned from step 109 to step 113 that, the second Bluetooth device may transmit the third Bluetooth message to the first Bluetooth device on the non-Bluetooth link between the first gateway and the second gateway. This effectively increases a transmission distance of the third Bluetooth message, improves flexibility of transmitting the Bluetooth message by the second Bluetooth device to the first Bluetooth device, and further improves flexibility of Bluetooth network networking.

Figure 7:
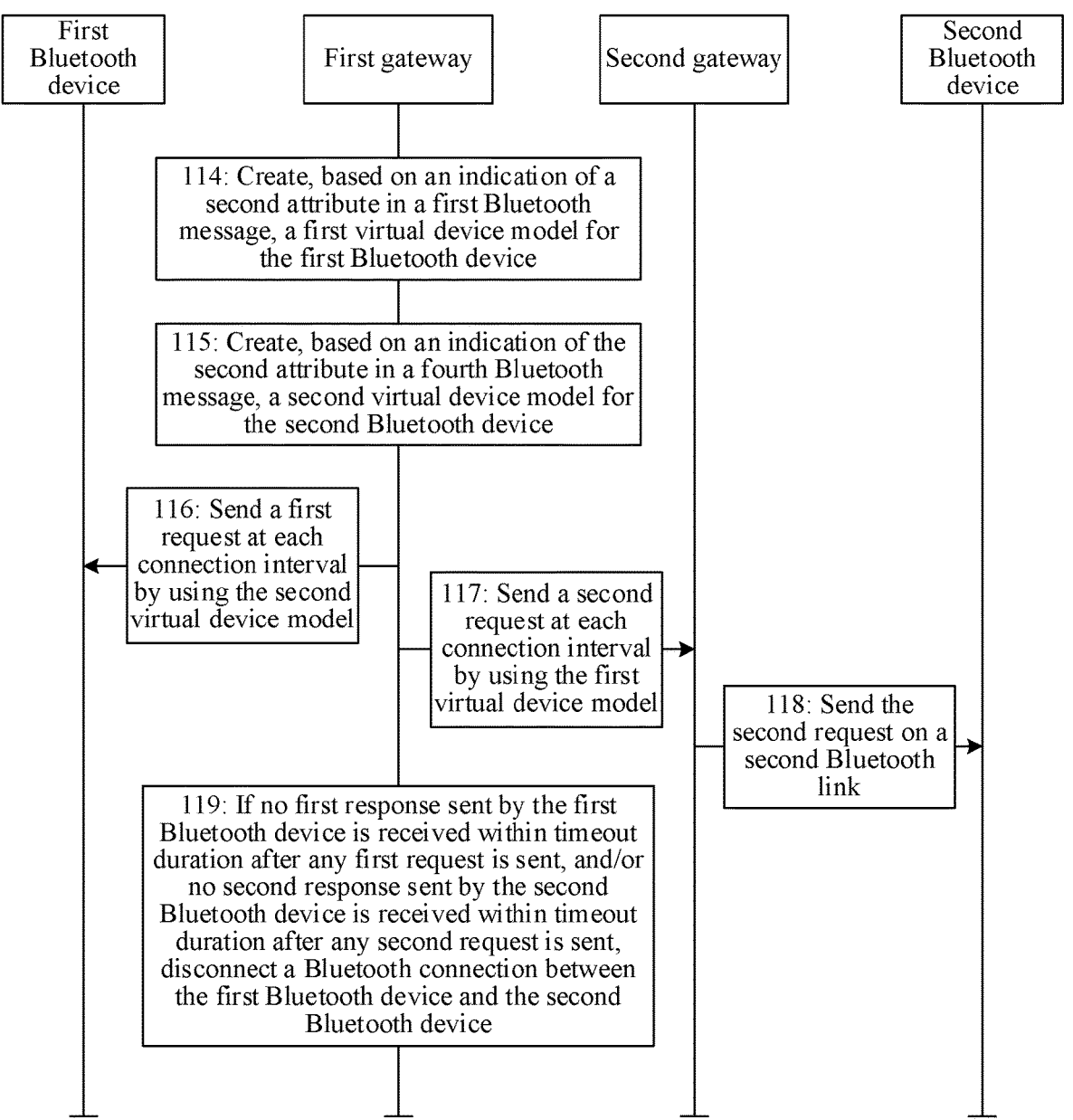
FIG. 7 is a flowchart of a method for a first gateway to perform a connection management on a Bluetooth connection according to an embodiment of this application.

Optionally, after the first Bluetooth device establishes the Bluetooth connection to the second Bluetooth device on the non-Bluetooth link, the first gateway may further perform connection management on the Bluetooth connection. The connection management may include at least keepalive management and timeout management. FIG. 7 is a flowchart of a method for a first gateway to perform connection management on the Bluetooth connection according to an embodiment of this application. Referring to FIG. 7, the method may include the following steps.

Step 114: A first gateway creates, based on an indication of second attribute information in a first Bluetooth message, a first virtual device model for a first Bluetooth device.

In a scenario in which the first Bluetooth message is a Bluetooth message sent by the first Bluetooth device in a device discovery stage, the first Bluetooth message may further include the second attribute information. The second attribute information in the first Bluetooth message may indicate that the first Bluetooth device supports performing connection management on a Bluetooth connection on a non-Bluetooth link. Correspondingly, the first gateway may create, based on the indication of the second attribute information in the first Bluetooth message, the first virtual device model for the first Bluetooth device.

The first virtual device model may be also referred to as a Bluetooth mirror of the first Bluetooth device, and the first gateway may simulate the first Bluetooth device by using the first virtual device model, to communicate with a second Bluetooth device.

It may be understood that if the first Bluetooth message does not include the second attribute information, the first gateway may determine that the first Bluetooth device does not support performing connection management on the Bluetooth connection on the non-Bluetooth link. Therefore, a virtual device model does not need to be created for the first Bluetooth device. In this way, a waste of processing resources of the first gateway can be avoided.

Step 115: The first gateway creates, based on the indication of the second attribute information in the fourth Bluetooth message, a second virtual device model for the second Bluetooth device.

In a scenario in which the fourth Bluetooth message is a Bluetooth message sent by the second Bluetooth device in the device discovery stage, the fourth Bluetooth message may further include the second attribute information. The second attribute information in the fourth Bluetooth message may indicate that the second Bluetooth device supports performing connection management on the Bluetooth connection on the non-Bluetooth link. Correspondingly, the first gateway may create, based on the indication of the second attribute information in the fourth Bluetooth message, the second virtual device model for the second Bluetooth device.

The second virtual device model may also be referred to as a Bluetooth mirror of the second Bluetooth device, and the first gateway may simulate the second Bluetooth device by using the second virtual device model, to communicate with the first Bluetooth device.

Optionally, the first gateway may create the first virtual device model based on an obtained related parameter of the first Bluetooth device, and may create the second virtual device model based on an obtained related parameter of the second Bluetooth device. A related parameter of a Bluetooth device may include at least a device parameter of the Bluetooth device, and a Bluetooth profile of the Bluetooth device. The device parameter may include at least one of the following parameters: a device name, a device model, a device address, a device vendor, and the like.

It may be understood that the virtual device model may also be referred to as a device model or a device object. This is not limited in this embodiment of this application.

It may be further understood that the Bluetooth message sent by the Bluetooth device in the device discovery stage may include first attribute information, but does not include the second attribute information. The first gateway may further create, based on an indication of the first attribute information, the virtual device model for the Bluetooth device. Alternatively, the Bluetooth message sent by each Bluetooth device in the Bluetooth network in the device discovery stage neither includes the first attribute information nor includes the second attribute information, and the first gateway may directly create a virtual device model for each Bluetooth device discovered by the first gateway.

Step 116: The first gateway sends a first request to the first Bluetooth device at each connection interval by using the second virtual device model.

After the first gateway determines that the first Bluetooth device establishes the Bluetooth connection to the second Bluetooth device on the non-Bluetooth link, to manage the Bluetooth connection, the first gateway may send the first request to the first Bluetooth device once at each connection interval by using the second virtual device model. The first request is sent on the first Bluetooth link between the first gateway and the first Bluetooth device, and the first request may indicate the first Bluetooth device to feed back a first response. A value range of the connection interval may be from 7.5 milliseconds to 4 seconds, and a value of the connection interval may be set by the first gateway based on a requirement of an application scenario.

Step 117: The first gateway sends a second request to the second gateway at each connection interval by using the first virtual device model.

After determining that the first Bluetooth device establishes the Bluetooth connection to the second Bluetooth device on the non-Bluetooth link, the first gateway may further send, to the second gateway at each connection interval by using the first virtual device model, the second request obtained through encapsulation by using the transport protocol. The second request is sent on the non-Bluetooth link between the first gateway and the second gateway.

Figure 8:
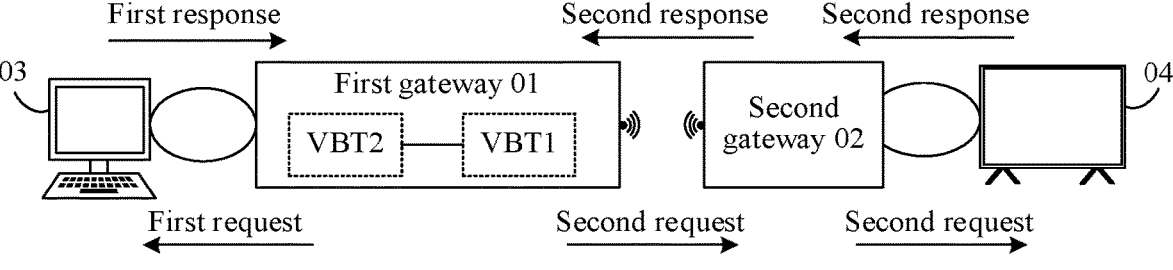
FIG. 8 is a schematic diagram of performing connection management on a Bluetooth connection by a first gateway according to an embodiment of this application.

For example, referring to FIG. 8, it is assumed that the first virtual device model created by a first gateway 01 for the first Bluetooth device is VBT1, the second virtual device model created for the second Bluetooth device is VBT2, and duration of the connection interval is T0. In this case, the first gateway 01 may send the first request to a first Bluetooth device 03 once at each interval of T0 by using VBT2, and may send the second request to a second Bluetooth device 04 once at each interval of T0 by using VBT1.

Step 118: The second gateway forwards the second request to the second Bluetooth device on the second Bluetooth link.

After receiving the second request on the non-Bluetooth link, the second gateway may forward the second request to the second Bluetooth device on the second Bluetooth link. For example, the second gateway may decapsulate, by using the transport protocol adapted to the non-Bluetooth link, the received second request, and then forward a decapsulated second request to the second Bluetooth device on the second Bluetooth link. The decapsulated second request indicates the second Bluetooth device to feed back a second response on the second Bluetooth link.

Step 119: If no first response sent by the first Bluetooth device is received within timeout duration after any first request is sent, and/or no second response sent by the second Bluetooth device is received within timeout duration after any second request is sent, the first gateway disconnects the Bluetooth connection between the first Bluetooth device and the second Bluetooth device.

It can be learned with reference to the foregoing step 116 and step 117 that the first gateway may periodically and separately send a request to the first Bluetooth device and the second Bluetooth device based on the connection interval. A Bluetooth device that receives the request may selectively respond to the request. As shown in FIG. 8, the first Bluetooth device may respond to the first request by sending the first response, and the second Bluetooth device may respond to the second request by sending the second response. It can be learned from FIG. 8 that the second response needs to be transmitted to the first gateway through the second gateway.

It may be understood that, if the Bluetooth device that receives the request has service data to send, a response that carries the service data may be directly sent to the first gateway. If the Bluetooth device that receives the request has no service data to send, the request may be ignored, and a quantity of requests continuously ignored by the Bluetooth device needs to be less than or equal to a quantity threshold N. In other words, if the Bluetooth device continuously ignores N requests, after the Bluetooth device receives an $(N+1)^{th}$ request, even if no service data needs to be sent, the Bluetooth device needs to feed back, to the first gateway, a connection response that does not carry the service data. In this way, power consumption of the Bluetooth device can be effectively reduced while reliable transmission of the service data is ensured.

If the first gateway detects that a quantity of requests continuously ignored by a Bluetooth device is greater than the quantity threshold N, the first gateway may determine that the Bluetooth device cannot normally receive or send a message, and may further disconnect a Bluetooth connection of the Bluetooth device. The quantity threshold N may also be referred to as a slave latency), and a value range of the quantity threshold N may be from 0 to 499.

To determine whether the quantity of requests ignored by the Bluetooth device is greater than the quantity threshold N, the first gateway may store timeout duration T1. The timeout duration T1 is greater than a connection interval T0, and the timeout duration T1 may meet: $T1>T0\times(N+1)$. If the first gateway detects that no first response sent by the first Bluetooth device is received within the timeout duration after any first request is sent (that is, a quantity of requests continuously ignored by the first Bluetooth device is greater than N), and/or no second response sent by the second Bluetooth device is received within the timeout duration after any second request is sent (that is, a quantity of requests continuously ignored by the second Bluetooth device is greater than N), the first gateway may disconnect the Bluetooth connection between the first Bluetooth device and the second Bluetooth device.

It may be understood that, the first gateway may further flexibly adjust the quantity threshold N based on the requirement of the application scenario, that is, flexibly adjust the timeout duration T1. A value range of the timeout duration T1 may be from 10 milliseconds to 32 seconds.

It may be further understood that, that the first gateway performs keepalive management on the Bluetooth connection may be: The first gateway adjusts the connection interval, and periodically sends the request to the Bluetooth device by using the virtual device model. That the first gateway performs timeout management on the Bluetooth connection may be: The first gateway adjusts the timeout duration, and determines, based on the timeout duration, whether to disconnect the Bluetooth connection between Bluetooth devices.

It may be further understood that the Bluetooth network may include a plurality of first Bluetooth devices and a plurality of second Bluetooth devices. Alternatively, the first gateway may be connected to a third gateway on the non-Bluetooth link, and the third gateway may be connected to at least one third Bluetooth device on the Bluetooth link. In this case, the first gateway serves as a master gateway, and may create, by using the method shown in step 114 or step 115, a virtual device model for each Bluetooth device discovered by the first gateway. To be specific, the first gateway may create a global virtual device resource pool. The virtual device resource pool includes the virtual device model of each Bluetooth device in the Bluetooth network, and each virtual device model has a unique global identifier (ID).

Optionally, in addition to performing connection management on the Bluetooth connection between the Bluetooth devices by using the virtual device model, the first gateway may further manage and control the Bluetooth device. In addition, after creating a virtual device model for a Bluetooth device, the first gateway may forward a Bluetooth message from the Bluetooth device on the non-Bluetooth link by using the global ID of the virtual device model of the Bluetooth device.

It may be further understood that, because the second gateway may be connected to a plurality of second Bluetooth devices, the first Bluetooth device may establish the Bluetooth connection to the plurality of second Bluetooth devices on one Bluetooth link between the first Bluetooth device and the first gateway. In other words, the first Bluetooth device may exchange data with the plurality of second Bluetooth devices on one Bluetooth link. Therefore, flexibility of exchanging the Bluetooth message is effectively improved. For example, the first Bluetooth device may exchange the data with more than three second Bluetooth devices on one Bluetooth link.

Similarly, the second Bluetooth device may also exchange the data with a plurality of first Bluetooth devices on one Bluetooth link between the second Bluetooth device and the second gateway. In addition, because the virtual device resource pool of the first gateway includes the virtual device model of each Bluetooth device, the first gateway may perform connection management on a plurality of Bluetooth connections of the Bluetooth device by using the virtual device model.

It may be further understood that, in a scenario in which the Bluetooth network includes the plurality of first Bluetooth devices and the plurality of second Bluetooth devices, the first gateway may send the Bluetooth message from at least one first Bluetooth device to at least two second Bluetooth devices in parallel, and a sequence of sending the Bluetooth message to each second Bluetooth device is not limited. In other words, the first gateway supports one-to-many or many-to-many concurrent communication, that is, supports Bluetooth message transmission in an asynchronous multi-channel concurrent manner. Therefore, transmission efficiency of the Bluetooth message is effectively improved and transmission latency of the Bluetooth message is reduced.

Step 114 to step 119 are described by using an example in which the first gateway performs connection management on the Bluetooth connection between the first Bluetooth device and the second Bluetooth device. In a possible example, the first gateway may further perform connection management on the Bluetooth connection between the first gateway and the first Bluetooth device by sending the first request. In another possible example, the first gateway may further perform connection management on the Bluetooth connection between the first gateway and the second Bluetooth device by sending the second request. In still another possible example, the second gateway may alternatively perform connection management on the Bluetooth connection between the second gateway and the second Bluetooth device by sending a third request. In yet another possible example, the second request sent by the first gateway may come from the first Bluetooth device. To be specific, the first Bluetooth device may send the second request to the second Bluetooth device through two gateways, to perform connection management on the Bluetooth connection between the first Bluetooth device and the second Bluetooth device. For implementation processes of the foregoing examples, refer to related descriptions of step 116 to step 119. Details are not described herein again.

It may be further understood that if the Bluetooth device directly performs connection management on the Bluetooth connection, efficiency of connection management may be low. The first Bluetooth device is used as an example. The second request sent by the first Bluetooth device needs to pass through two gateways before being transmitted to the second Bluetooth device, and the second response sent by the second Bluetooth device also needs to pass through two gateways before being transmitted to the first Bluetooth device. In this case, a transmission path of the message in a connection management process is long and the transmission latency is long, resulting in low efficiency of connection management. However, by sending the request through the first gateway, connection management can be implemented in a heterogeneous Bluetooth network, the transmission path of the message in the connection management process is effectively shortened, and the efficiency of connection management is further effectively improved.

Figure 9:
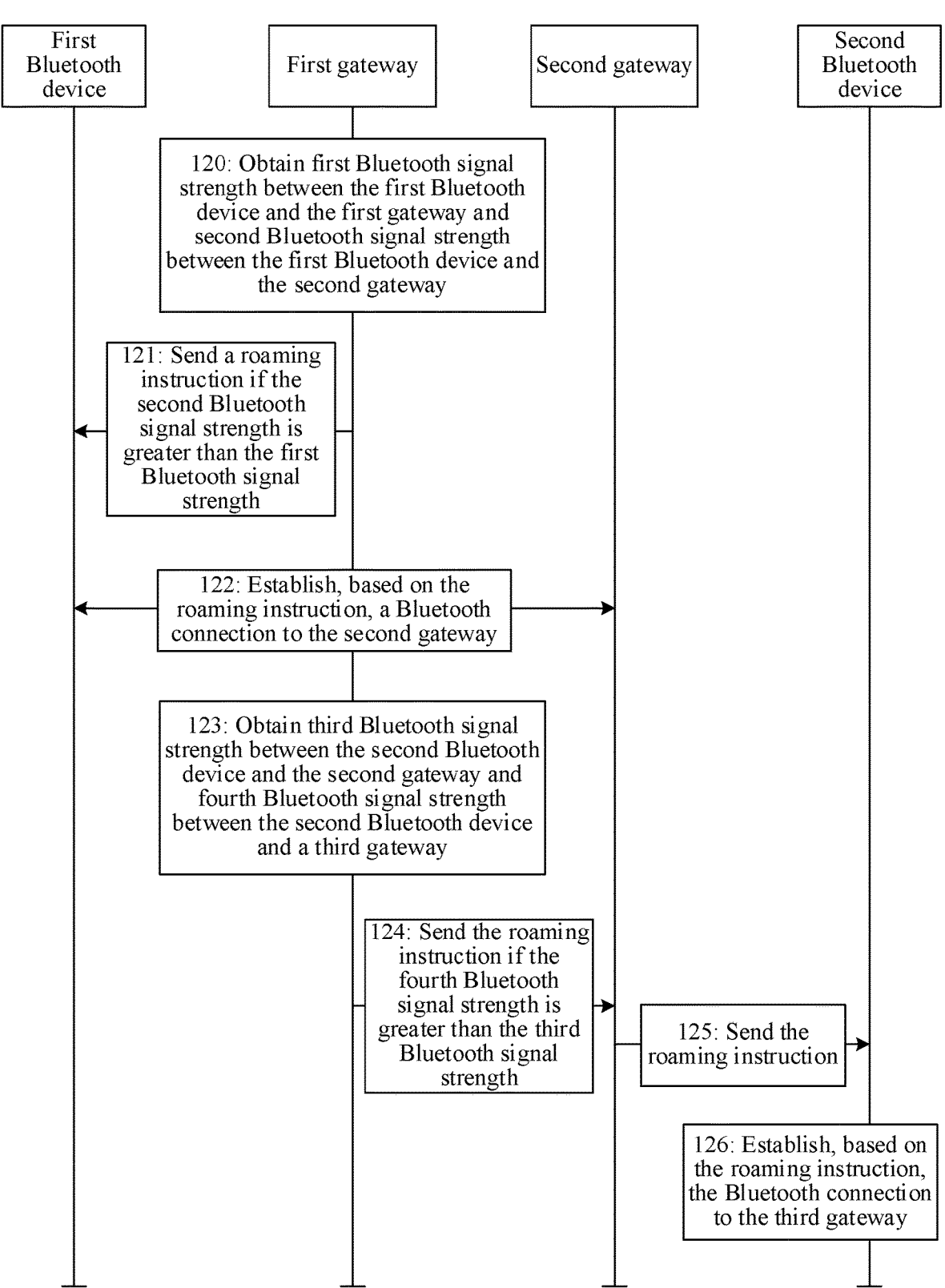
FIG. 9 is a flowchart of a Bluetooth device roaming method controlled by a first gateway according to an embodiment of this application.

Optionally, the first gateway may further control, based on Bluetooth signal strength between the Bluetooth device and each gateway, the Bluetooth device to roam between different gateways. The roaming of the Bluetooth device between different gateways may be: The Bluetooth device switches a gateway that establishes the Bluetooth connection with the Bluetooth device. FIG. 9 is a flowchart of a method for a first gateway to control roaming of a Bluetooth device according to an embodiment of this application. Referring to FIG. 9, the method may include the following steps.

Step 120: A first gateway obtains first Bluetooth signal strength between a first Bluetooth device and the first gateway and second Bluetooth signal strength between the first Bluetooth device and a second gateway.

The first gateway may obtain the first Bluetooth signal strength between the first Bluetooth device and the first gateway and the second Bluetooth signal strength between the first Bluetooth device and the second gateway on a first Bluetooth link after a Bluetooth connection to the first Bluetooth device is established. The first Bluetooth signal strength may be actively reported by the first Bluetooth device to the first gateway on the first Bluetooth link. For the second Bluetooth signal strength, the first gateway may send a signal strength obtaining request to the first Bluetooth device on the first Bluetooth link, and the first Bluetooth device may detect, based on the signal strength obtaining request, the second Bluetooth signal strength between the first Bluetooth device and the second gateway, and report the second Bluetooth signal strength to the first gateway on the first Bluetooth link.

In a scenario in which a first Bluetooth message is a Bluetooth message sent by the first Bluetooth device in a device discovery stage, in a possible example, the first Bluetooth message may further include third attribute information. The third attribute information indicates that the first Bluetooth device supports roaming between different gateways. Correspondingly, the first gateway may obtain, based on an indication of the third attribute information in the first Bluetooth message, the first Bluetooth signal strength between the first Bluetooth device and the first gateway and the second Bluetooth signal strength between the first Bluetooth device and the second gateway on the first Bluetooth link after the Bluetooth connection to the first Bluetooth device is established.

In the foregoing example, if the Bluetooth message sent by the first Bluetooth device in the device discovery stage does not include the third attribute information, the first gateway may determine that the first Bluetooth device does not support the roaming between the different gateways. Then the first gateway does not need to perform the foregoing step 120 after the Bluetooth connection to the first Bluetooth device is established.

In another possible example, the first Bluetooth message sent by the first Bluetooth device in the device discovery stage may include first attribute information, but does not include the third attribute information. The first gateway may obtain, based on an indication of the first attribute information, the first Bluetooth signal strength and the second Bluetooth signal strength on the first Bluetooth link after the Bluetooth connection to the first Bluetooth device is established.

In still another possible example, the first Bluetooth message sent by the first Bluetooth device in the device discovery stage may not include the first attribute information or the third attribute information. The first gateway may obtain Bluetooth signal strength between a Bluetooth device and each gateway after the Bluetooth connection to any Bluetooth device in the Bluetooth network is established.

Step 121: The first gateway sends a roaming instruction to the first Bluetooth device if the second Bluetooth signal strength is greater than the first Bluetooth signal strength.

The first gateway may determine that transmission quality of a Bluetooth message between the first Bluetooth device and the second gateway is better if the first gateway detects that the second Bluetooth signal strength is greater than the first Bluetooth signal strength. Therefore, the first gateway may send the roaming instruction to the first Bluetooth device on the first Bluetooth link, to indicate the first Bluetooth device to establish the Bluetooth connection to the second gateway.

It may be understood that, the first gateway may determine that the first Bluetooth device does not need to roam if the second Bluetooth signal strength is not greater than the first Bluetooth signal strength, and then does not need to send the roaming instruction to the first Bluetooth device.

Step 122: The first Bluetooth device establishes, based on the roaming instruction, the Bluetooth connection to the second gateway.

After receiving the roaming instruction, the first Bluetooth device may disconnect the Bluetooth connection to the first gateway, and establish the Bluetooth connection to the second gateway. Because the Bluetooth signal strength between the first Bluetooth device and the second gateway is higher, it can be ensured that the transmission quality of the Bluetooth message is better after the Bluetooth connection to the second gateway is established.

Step 123: The first gateway obtains third Bluetooth signal strength between a second Bluetooth device and the second gateway and fourth Bluetooth signal strength between the second Bluetooth device and a third gateway.

Figure 10:
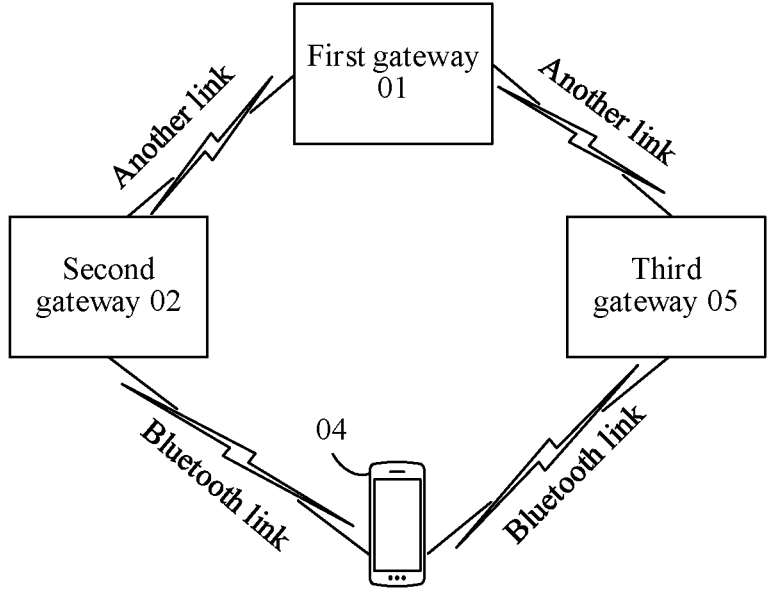
FIG. 10 is a schematic diagram of a structure of still another Bluetooth network according to an embodiment of this application.

As shown in FIG. 10, the Bluetooth network may further include a third gateway 05, and a non-Bluetooth link further exists between the third gateway 05 and the first gateway 01. It may be understood that the third gateway 05 is also a slave gateway, and the third gateway 05 also includes a Bluetooth communication module. The first gateway 01 may further obtain third Bluetooth signal strength between a second Bluetooth device 04 and a second gateway 02 and fourth Bluetooth signal strength between the second Bluetooth device 04 and the third gateway 05 on the non-Bluetooth link after determining that the second gateway 02 establishes the Bluetooth connection to the second Bluetooth device.

Optionally, the second Bluetooth device may actively report the third Bluetooth signal strength to the second gateway after the second gateway establishes the Bluetooth connection to the second Bluetooth device, and the second gateway may report the third Bluetooth signal strength to the first gateway on the non-Bluetooth link. After receiving the third Bluetooth signal strength, the first gateway may further send the signal strength obtaining request to the second gateway on the non-Bluetooth link, and the second gateway may forward the signal strength obtaining request to the second Bluetooth device on the second Bluetooth link. The second Bluetooth device may detect, based on the strength obtaining request, the fourth Bluetooth signal strength between the second Bluetooth device and the third gateway, and report the fourth Bluetooth signal strength to the second gateway on the second Bluetooth link. The second gateway may report the fourth Bluetooth signal strength to the first gateway on the non-Bluetooth link.

It may be understood that both the strength obtaining request and the Bluetooth signal strength that are transmitted on the non-Bluetooth link are obtained through encapsulation by using a transport protocol adapted to the non-Bluetooth link.

It may be further understood that, referring to step 120, in a possible example, the Bluetooth message sent by the second Bluetooth device in the device discovery stage may carry at least one piece of attribute information of the first attribute information and the third attribute information. The first gateway may perform step 123 after determining, based on the at least one piece of attribute information, that the second Bluetooth device supports the roaming between the different gateways; otherwise, the first gateway does not need to perform step 123. In other words, if the first gateway determines that a Bluetooth device does not support the roaming between the different gateways, the Bluetooth signal strength between the Bluetooth device and each gateway does not need to be obtained. Therefore, a waste of detection resources of the Bluetooth device caused by detection of Bluetooth signal strength by the Bluetooth device can be avoided, and a waste of transmission resources of the Bluetooth network caused by transmission of Bluetooth signal strength can be avoided.

In another possible example, the Bluetooth message sent by the second Bluetooth device in the device discovery stage may not include the first attribute information, and may not include the third attribute information. After detecting that any Bluetooth device in the Bluetooth network establishes the Bluetooth connection to the slave gateway, the first gateway may obtain the Bluetooth signal strength between the Bluetooth device and each gateway.

Step 124: The first gateway sends the roaming instruction to the second gateway if the fourth Bluetooth signal strength is greater than the third Bluetooth signal strength.

The first gateway may determine that the transmission quality of the Bluetooth message between the second Bluetooth device and the third gateway is better if the first gateway detects that the fourth Bluetooth signal strength is greater than the third Bluetooth signal strength. Therefore, the first gateway may send, to the second gateway on the non-Bluetooth link, the roaming instruction obtained through encapsulation by using the transport protocol. The roaming instruction indicates the second Bluetooth device to roam to the third gateway.

It may be understood that the first gateway may determine that the second Bluetooth device does not need to roam if the fourth Bluetooth signal strength is not greater than the third Bluetooth signal strength, and then does not need to send the roaming instruction to the second gateway.

Step 125: The second gateway sends the roaming instruction to the second Bluetooth device.

After receiving the roaming instruction, the second gateway may decapsulate, by using a transport protocol, the roaming instruction, and send a decapsulated roaming instruction to the second Bluetooth device on the second Bluetooth link.

Step 126: The second Bluetooth device establishes, based on the roaming instruction, the Bluetooth connection to the third gateway.

After receiving the roaming instruction, the second Bluetooth device may disconnect, based on the indication of the roaming instruction, the Bluetooth connection to the second gateway, and establish the Bluetooth connection to the third gateway. Because the Bluetooth signal strength between the second Bluetooth device and the third gateway is higher, it can be ensured that the transmission quality of the Bluetooth message is better after the Bluetooth connection to the third gateway is established.

It may be understood that in a scenario in which the Bluetooth network further includes a slave gateway other than the second gateway, in step 120 and step 123, the first gateway may obtain the Bluetooth signal strength between the Bluetooth device and each gateway. For example, the first gateway may further obtain Bluetooth signal strength between the first Bluetooth device and the third gateway. Correspondingly, in the foregoing step 121 and step 124, for each Bluetooth device, the first gateway may determine, from the gateways, a gateway having highest Bluetooth signal strength with the Bluetooth device. If the gateway having the highest Bluetooth signal strength is not a gateway that establishes the Bluetooth connection to the Bluetooth device, the first gateway may send the roaming instruction, to indicate the Bluetooth device to roam to the gateway having the highest Bluetooth signal strength.

It can be learned from step 120 to step 126 that, because the first gateway may control, based on Bluetooth signal strength, roaming of the Bluetooth device, it can be ensured that the Bluetooth device can establish the Bluetooth connection to a gateway having high Bluetooth signal strength, and then the transmission quality of the Bluetooth message is effectively ensured.

It may be understood that, because each gateway in the Bluetooth network includes the Bluetooth communication module, each gateway may also send the Bluetooth message. The Bluetooth message may be any one of the following messages: a broadcast message in an advertising event, a scanning request message and a scanning response message in a scanning event, a connection request message in a connection initiation event, or a message in a connection event. In addition, the Bluetooth message sent by each gateway in the device discovery stage may carry at least one of the first attribute information, the second attribute information, and the third attribute information.

In an optional implementation, the first attribute information may be attribute information defined in an attribute (ATT) protocol. The attribute information defined in the ATT protocol may include: an attribute handle, an attribute type (attribute type), an attribute value, and an attribute permission. In a possible example, a piece of attribute information that has been defined in the ATT protocol may be modified, to be used as the first attribute information. In another possible example, a piece of attribute information may be newly added to the ATT protocol as the first attribute information.

The first attribute information may indicate that a device (the Bluetooth device or the gateway) in the Bluetooth network supports transmission of the Bluetooth message on the non-Bluetooth link. Because the Bluetooth network may also be referred to as a heterogeneous Bluetooth network, it may also be understood that the first attribute information indicates that the device has a capability of accessing the heterogeneous Bluetooth network. For a scenario in which the Bluetooth network is a Bluetooth mesh network, the first attribute information may indicate that a device has a capability (heterogeneous Bluetooth mesh capability) of accessing a heterogeneous Bluetooth mesh network.

For example, referring to Table 1, attribute information that has been defined in the ATT protocol and whose handle value is 42 may be modified. For example, the attribute value is modified from 00:00 to EE:EE, to be used as the first attribute information. Alternatively, attribute information whose handle value is 43 may be newly added as the first attribute information. A value of the newly added first attribute type may be 0x2903 (0x represents a hexadecimal number), the permission is read and write, the attribute value is 11, and a length of the attribute value may be 1 byte. It may be understood that, the value of the newly added first attribute handle may also be another value except 43, and the value of the type may also be another value except 0x2903.

TABLE 1

| Handle | Type | Permission | Value |
|---|---|---|---|
| 42 | 0x2902 | read and read | EE:EE |
| 43 or others | 0x2903 or others | read and write | 11 |

It may be understood that both the second attribute information and the third attribute information may be the attribute information defined in the ATT protocol. Details are not described herein.

In another optional implementation, the first attribute information may be GATT attribute information defined in a generic attribute (GATT) protocol. The GATT attribute information defined in the GATT protocol may also include: the attribute handle, the attribute type, and the attribute value. The attribute type may be represented by a universally unique identifier (UUID). A value range of the attribute handle is 0x0001 to 0xFFFF, and a value of different GATT attribute handle is different. That is, the value of each GATT attribute handle is unique in a service table. To facilitate management, the value of each GATT attribute handle of a same service increases at an equal interval. Based on the value range of the attribute handle, a maximum of 65536 pieces of GATT attribute information can be defined in the GATT protocol.

Optionally, a piece of GATT attribute information may be newly added to the GATT protocol as the first attribute information. For example, referring to Table 2, GATT attribute information whose value of the handle is 0x0215 may be newly added as the first attribute information. A UUID of the first attribute information may be 0x2903, and the attribute value may be 00.

TABLE 2

| Handle | UUID | Value |
|---|---|---|
| 0x0215 | 0x2903 | 00 |
| 0x0216 | 0x2904 | 00 |
| 0x0217 | 0x2905 | 00 |
| 0x0218 | 0x2906 | 00 |

Optionally, two pieces of GATT attribute information may be further newly added to the GATT protocol as the second attribute information and the third attribute information respectively. For example, still referring to Table 2, GATT attribute information whose value of the handle is 0x0216 may be newly added as the second attribute information. A UUID of the second attribute information may be 0x2904, and the attribute value may be 00. In addition, GATT attribute information whose value of handle is 0x0217 may be newly added as the third attribute information. A UUID of the third attribute information may be 0x2905, and the attribute value may be 00.

It may be understood that, for a Bluetooth mesh network scenario, the second attribute information may indicate that the device has a capability of performing connection management on the Bluetooth connection in the heterogeneous Bluetooth mesh network, for example, has a capability (heterogeneous Bluetooth mesh keepalive capability) of implementing keepalive management in the heterogeneous Bluetooth mesh network. The third attribute information may indicate that the device has a capability (heterogeneous Bluetooth mesh roaming capability) of roaming in the heterogeneous Bluetooth mesh network.

Optionally, a message sent by the device in the Bluetooth network at the device discovery stage may further include fourth attribute information, and the fourth attribute information may indicate that the device supports establishing the Bluetooth connection to M Bluetooth devices on the non-Bluetooth link. M is an integer greater than 1. For example, M may be greater than 3, to be specific, the fourth attribute information may indicate that the device can establish the Bluetooth connection to more than three Bluetooth devices on the non-Bluetooth link. In a scenario in which the Bluetooth network is the Bluetooth mesh network, the fourth attribute information may indicate that the device has a capability of establishing the Bluetooth connection to a plurality of Bluetooth devices in the heterogeneous Bluetooth mesh network.

It may be further understood that the message sent by the device in the Bluetooth network in the device discovery stage may include two pieces of first attribute information. One piece of first attribute information may be the attribute information defined in the ATT protocol, and the other piece of first attribute information may be the GATT attribute information. In addition, the second attribute information, the third attribute information, and the fourth attribute information each may include two pieces of attribute information.

It may be further understood that a sequence of steps in the foregoing method embodiments may be properly adjusted, or steps may be correspondingly added or deleted based on a situation. For example, step 101 to step 103 may be deleted based on the situation. Alternatively, step 109 to step 113 may be deleted based on the situation, or may be performed before step 108. Alternatively, step 115 may be performed before step 114, and step 117 may be performed before step 116. Alternatively, step 123 to step 126 may be performed before step 122. Alternatively, step 114 and step 115 may be deleted based on the situation. To be specific, the first gateway may not need to create a virtual device model for the Bluetooth device, but may directly send a first request and a second request. For example, the first gateway may send, to the first Bluetooth device based on an indication of the second attribute information in the first Bluetooth message, the first request at each connection interval, and may send, to the second Bluetooth device based on the indication of the second attribute information in the fourth Bluetooth message, the second request at each connection interval.

In conclusion, this embodiment of this application provides the Bluetooth message transmission method. The first gateway may encapsulate, by using the transport protocol adapted to the non-Bluetooth link, the first Bluetooth message sent by the first Bluetooth device, to obtain a second Bluetooth message, and may send the second Bluetooth message to the second gateway on the non-Bluetooth link. The second gateway may decapsulate the second Bluetooth message to obtain the first Bluetooth message and then send the first Bluetooth message to the second Bluetooth device. According to the method according to an embodiment of this application, two Bluetooth devices may transmit the Bluetooth message on the non-Bluetooth link. This effectively increases a transmission distance of the Bluetooth message is, improves flexibility of transmission of the Bluetooth message, and further improves flexibility of Bluetooth network networking.

In addition, because the first gateway may further perform connection management on the Bluetooth connection between Bluetooth devices, efficiency of connection management can be effectively improved. In addition, because the first gateway may control, based on Bluetooth signal strength, the roaming of the Bluetooth device, it can be ensured that the Bluetooth device can establish the Bluetooth connection to the gateway having the high Bluetooth signal strength, and then the transmission quality of the Bluetooth message is effectively ensured.

Figure 11:
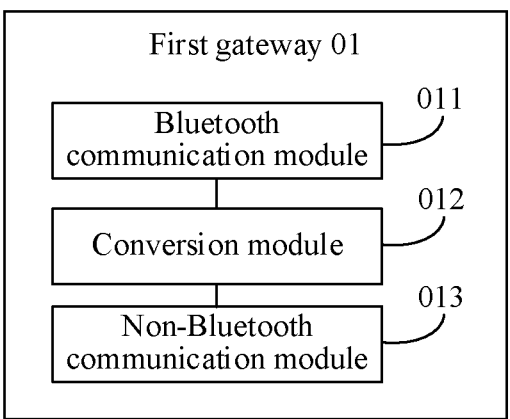
FIG. 11 is a schematic diagram of a structure of a first gateway according to an embodiment of this application.

FIG. 11 is a schematic diagram of a structure of a first gateway according to an embodiment of this application. The first gateway may be used in the Bluetooth network in FIG. 1, and may be configured to implement the steps performed by the first gateway in the foregoing method embodiments. As shown in FIG. 11, a first gateway 01 includes the following modules.

A Bluetooth communication module 011 is configured to receive, on a first Bluetooth link with a first Bluetooth device, a first Bluetooth message sent by the first Bluetooth device. For implementation of a function of the Bluetooth communication module oil, refer to related descriptions of step 104 in the foregoing method embodiment.

A conversion module 012 is configured to encapsulate, by using a transport protocol adapted to a non-Bluetooth link between the first gateway and a second gateway, the first Bluetooth message to obtain a second Bluetooth message. For implementation of a function of the Bluetooth conversion module 012, refer to related descriptions of step 105 in the foregoing method embodiment.

A non-Bluetooth communication module 013 is configured to send the second Bluetooth message to the second gateway on the non-Bluetooth link. The second gateway decapsulates the second Bluetooth message by using the transport protocol, to obtain the first Bluetooth message, and sends the first Bluetooth message to a second Bluetooth device on a second Bluetooth link with the second Bluetooth device. The non-Bluetooth link is a wireless local area network link or a wired link.

For implementation of a function of the non-Bluetooth communication module 013, refer to related descriptions of step 106 in the foregoing method embodiment.

Optionally, the Bluetooth communication module 011 may be further configured to: select a first Bluetooth broadcast channel as a Bluetooth broadcast channel of the first gateway, and select a first Bluetooth data channel as a Bluetooth data channel of the first gateway.

For implementation of a function of the Bluetooth communication module 011, further refer to related descriptions of step 101 in the foregoing method embodiment.

The non-Bluetooth communication module 013 may be further configured to send a Bluetooth channel allocation instruction to the second gateway on the non-Bluetooth link. The Bluetooth channel allocation instruction indicates the second gateway to use a second Bluetooth broadcast channel as a Bluetooth broadcast channel of the second gateway, and use a second Bluetooth data channel as a Bluetooth data channel of the second gateway. For implementation of a function of the non-Bluetooth communication module 013, further refer to related descriptions of step 102 in the foregoing method embodiment.

Optionally, the first Bluetooth message may include service data.

Optionally, the first Bluetooth message may include first attribute information, and the first attribute information indicates that the first Bluetooth device supports transmission of a Bluetooth message on the non-Bluetooth link.

Optionally, the Bluetooth communication module 011 may be further configured to send a first request to the first Bluetooth device at each connection interval on the first Bluetooth link. The first request indicates the first Bluetooth device to feed back a first response on the first Bluetooth link.

The non-Bluetooth communication module 013 may be further configured to send, to the second gateway at each connection interval on the non-Bluetooth link, a second request obtained through encapsulation by using the transport protocol. The second request is sent to the second Bluetooth device on the second Bluetooth link after been decapsulated by the second gateway, and indicates the second Bluetooth device to feed back a second response on the second Bluetooth link.

Optionally, the first Bluetooth message includes second attribute information, and the second attribute information indicates that a Bluetooth device supports performing connection management on a Bluetooth connection on the non-Bluetooth link. The Bluetooth communication module 011 may be configured to send, to the first Bluetooth device based on an indication of the second attribute information in the first Bluetooth message, the first request at each connection interval on the first Bluetooth link. For implementation of a function of the Bluetooth communication module oil, further refer to related descriptions of step 114 and step 116 in the foregoing method embodiment.

The non-Bluetooth communication module 013 may be further configured to receive, on the non-Bluetooth link, a third Bluetooth message sent by the second gateway. The third Bluetooth message is obtained by encapsulating, by the second gateway by using the transport protocol, a fourth Bluetooth message received on the second Bluetooth link, and the fourth Bluetooth message includes the second attribute information. For implementation of a function of the non-Bluetooth communication module 013, further refer to related descriptions of step 111 in the foregoing method embodiment.

The conversion module 012 may be further configured to decapsulate, by using the transport protocol, the third Bluetooth message to obtain the fourth Bluetooth message. For implementation of a function of the Bluetooth conversion module 012, further refer to related descriptions of step 112 in the foregoing method embodiment.

The non-Bluetooth communication module 013 may be configured to send, to the second gateway based on an indication of the second attribute information in the fourth Bluetooth message, the second request at each connection interval on the non-Bluetooth link. For implementation of a function of the non-Bluetooth communication module 013, further refer to related descriptions of step 115 and step 117 in the foregoing method embodiment.

Optionally, the Bluetooth communication module 011 may be further configured to: obtain first Bluetooth signal strength between the first Bluetooth device and the first gateway and second Bluetooth signal strength between the first Bluetooth device and the second gateway on the first Bluetooth link after the Bluetooth connection to the first Bluetooth device is established, and send a roaming instruction to the first Bluetooth device on the first Bluetooth link if the second Bluetooth signal strength is greater than the first Bluetooth signal strength. The roaming instruction indicates the first Bluetooth device to establish the Bluetooth connection to the second gateway.

For implementation of a function of the Bluetooth communication module oil, further refer to related descriptions of step 120 and step 121 in the foregoing method embodiment.

Optionally, the first Bluetooth message includes third attribute information, and the third attribute information indicates that the first Bluetooth device supports roaming between different gateways. The Bluetooth communication module 011 may be configured to:

obtain, based on an indication of the third attribute information in the first Bluetooth message, the first Bluetooth signal strength between the first Bluetooth device and the first gateway and the second Bluetooth signal strength between the first Bluetooth device and the second gateway on the first Bluetooth link after the Bluetooth connection to the first Bluetooth device is established.

In conclusion, this embodiment of this application provides the first gateway. The first gateway may encapsulate, by using a transport protocol adapted to the non-Bluetooth link, the first Bluetooth message sent by the first Bluetooth device to obtain the second Bluetooth message, and may send the second Bluetooth message to the second gateway on the non-Bluetooth link. The second gateway may decapsulate the second Bluetooth message to obtain the first Bluetooth message and then send the first Bluetooth message to the second Bluetooth device. Based on the first gateway according to this embodiment of this application, two Bluetooth devices may transmit the Bluetooth message on the non-Bluetooth link. This effectively increases a transmission distance of the Bluetooth message, improves flexibility of transmission of the Bluetooth message, and further improves flexibility of Bluetooth network networking.

Figure 12:
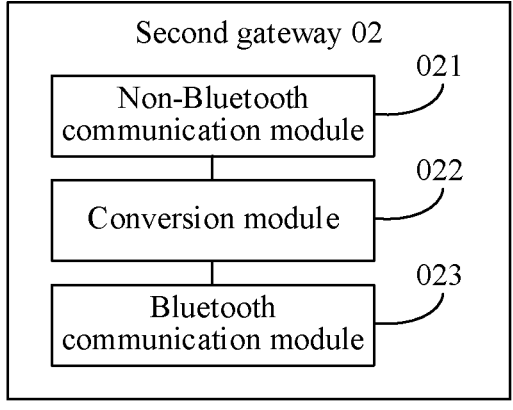
FIG. 12 is a schematic diagram of a structure of a second gateway according to an embodiment of this application.

FIG. 12 is a schematic diagram of a structure of a second gateway according to an embodiment of this application. The second gateway may be used in the Bluetooth network in FIG. 1, and may be configured to implement the steps performed by the second gateway in the foregoing method embodiments. Referring to FIG. 12, a second gateway 02 includes the following modules.

A non-Bluetooth communication module 021 is configured to receive, on a non-Bluetooth link with a first gateway, a second Bluetooth message sent by the first gateway. The second Bluetooth message is obtained by encapsulating, by the first gateway by using a transport protocol adapted to the non-Bluetooth link, a first Bluetooth message received on a first Bluetooth link with a first Bluetooth device in the Bluetooth network. The non-Bluetooth link is a wireless local area network link or a wired link.

For implementation of a function of the non-Bluetooth communication module 021, refer to related descriptions of step 106 in the foregoing method embodiment.

A conversion module 022 is configured to decapsulate, by using the transport protocol, the second Bluetooth message to obtain the first Bluetooth message. For implementation of a function of the Bluetooth conversion module 022, refer to related descriptions of step 107 in the foregoing method embodiment.

A Bluetooth communication module 023 is configured to send the first Bluetooth message to a second Bluetooth device on a second Bluetooth link with the second Bluetooth device in the Bluetooth network. For implementation of a function of the Bluetooth communication module 023, refer to related descriptions of step 108 in the foregoing method embodiment.

Optionally, the non-Bluetooth communication module 021 may be further configured to receive, on the non-Bluetooth link, a Bluetooth channel allocation instruction sent by the first gateway. For implementation of a function of the non-Bluetooth communication module 021, further refer to related descriptions of step 102 in the foregoing method embodiment.

The Bluetooth communication module 023 may be further configured to use a second Bluetooth broadcast channel and a second Bluetooth data channel that are indicated in the Bluetooth channel allocation instruction as a Bluetooth broadcast channel and a Bluetooth data channel of the second gateway respectively.

For implementation of a function of the Bluetooth communication module 023, further refer to related descriptions of step 103 in the foregoing method embodiment.

Optionally, the Bluetooth communication module 023 may be further configured to receive, on the second Bluetooth link, a fourth Bluetooth message sent by the second Bluetooth device. For implementation of a function of the Bluetooth communication module 023, further refer to related descriptions of step 109 in the foregoing method embodiment.

The conversion module 022 may be further configured to encapsulate, by using the transport protocol, the fourth Bluetooth message to obtain a third Bluetooth message. For implementation of a function of the Bluetooth conversion module 022, refer to related descriptions of step 11*o* in the foregoing method embodiment.

The non-Bluetooth communication module 021 is further configured to send the third Bluetooth message to the first gateway on the non-Bluetooth link. The third Bluetooth message is used by the first gateway to decapsulate, by using a transport protocol, the third Bluetooth message to obtain the fourth Bluetooth message; and send the third Bluetooth message to the first Bluetooth device on the first Bluetooth link.

For implementation of a function of the non-Bluetooth communication module 021, further refer to related descriptions of step 111 in the foregoing method embodiment.

To sum up, this embodiment of this application provides the second gateway. The second gateway may decapsulate, by using the transport protocol adapted to the non-Bluetooth link, the second Bluetooth message sent by the first gateway to obtain the first Bluetooth message, and then may send the first Bluetooth message to a Bluetooth device on a Bluetooth link. Based on the second gateway according to this embodiment of this application, two Bluetooth devices may transmit the Bluetooth message on the non-Bluetooth link. This effectively increases a transmission distance of the Bluetooth message, improves flexibility of transmission of the Bluetooth message, and further improves flexibility of Bluetooth network networking.

It may be clearly understood by a person skilled in the art that, for a purpose of convenient and brief description, for a detailed working process of the foregoing first gateway, the second gateway, and the modules, reference may be made to a corresponding process in the foregoing method embodiments. Details are not described herein again.

It should be understood that both the first gateway and the second gateway according to an embodiment of this application may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. Alternatively, the Bluetooth message transmission method provided in the foregoing method embodiments may be implemented by using software. When the Bluetooth message transmission method provided in the foregoing method embodiments is implemented by using software, the modules in the first gateway and the second gateway may also be software modules.

Figure 13:
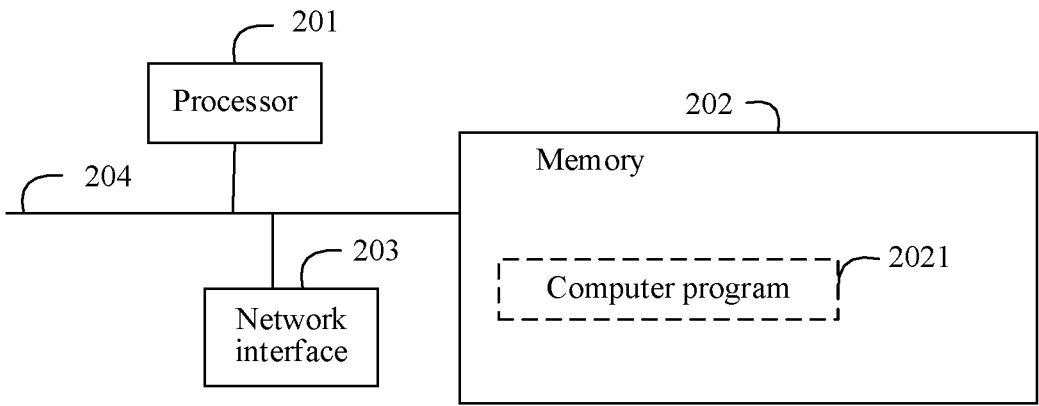
FIG. 13 is a schematic diagram of a structure of a gateway according to an embodiment of this application.

FIG. 13 is a schematic diagram of a structure of a gateway according to an embodiment of this application. The gateway may be the first gateway or the second gateway provided in the foregoing embodiments. Referring to FIG. 13, the gateway may include a processor 201, a memory 202, a network interface 203, and a bus 204. The bus 204 is configured to connect the processor 201, the memory 202, and the network interface 203. A communication connection to another device may be implemented through the network interface 203 (which may be wired or wireless). The memory 202 stores a computer program 2021. The computer program 2021 is used to implement various application functions.

It should be understood that, in this embodiment of this application, the processor 201 may be a CPU, or the processor 201 may be another general-purpose processor, a digital signal processor (DSP), an application-specific integrated circuit (ASIC), a field-programmable gate array (FPGA), a generic array logic (GAL) or another programmable logic device, a discrete gate or a transistor logic device, a discrete hardware component, or any combination of the foregoing processors. The general-purpose processor may be a microprocessor or any conventional processor.

The memory 202 includes a volatile memory, a non-volatile memory, or a combination thereof. The non-volatile memory may be a read-only memory (ROM), a programmable read-only memory (PROM), an erasable programmable read-only memory (EPROM), an electrically erasable programmable read-only memory (EEPROM), a flash memory, or any combination thereof. The volatile memory may be a random access memory (RAM), for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct rambus random access memory (DR RAM), or any combination thereof.

In addition to a data bus, the bus 204 may further include a power bus, a control bus, a state signal bus, and the like. However, for clear description, various types of buses in the figure are marked as the bus 204.

The processor 201 may be configured to execute computer programs stored in the memory 202. When the gateway is the first gateway, the processor 201 executes the computer programs 2021 to implement the steps performed by the first gateway in the foregoing method embodiments. When the gateway is the second gateway, the processor 201 executes the computer programs 2021 to implement the steps performed by the second gateway in the foregoing method embodiments.

An embodiment of this application further provides a computer-readable storage medium. The computer-readable storage medium stores instructions, and the instructions are executed by a processor to implement the steps performed by the first gateway or the steps performed by the second gateway in the foregoing method embodiments.

An embodiment of this application further provides a computer program product including instructions. When the computer program product is run on a computer, the computer is enabled to perform the steps performed by the first gateway or the steps performed by the second gateway in the foregoing method embodiments.

An embodiment of this application further provides a Bluetooth network. As shown in FIG. 1, the Bluetooth network includes a first gateway 01, a second gateway 02, a first Bluetooth device 03, and a second Bluetooth device 04. In addition, referring to FIG. 1, it can be learned that the Bluetooth network may include a plurality of first Bluetooth devices 03 and a plurality of second Bluetooth devices 04.

A structure of the first gateway 01 may be shown in FIG. 11 or FIG. 13, and a structure of the second gateway 02 may be shown in FIG. 12 or FIG. 13. In addition, a first Bluetooth link exists between the first Bluetooth device 03 and the first gateway 01, a second Bluetooth link exists between the second Bluetooth device 04 and the second gateway 02, and a non-Bluetooth link exists between the first gateway 01 and the second gateway 02. The non-Bluetooth link is a WLAN link or a wired link. For example, the non-Bluetooth link may be a Wi-Fi link.

Optionally, as shown in FIG. 1, the first gateway 01 and the second gateway 02 may be two gateways independent of each other. Alternatively, the first gateway 01 and the second gateway 02 may be configured in a same device.

Optionally, the Bluetooth network may further include at least one slave gateway other than the second gateway 02. Another link exists between each slave gateway and the first gateway 01, and each slave gateway may establish a Bluetooth link to a Bluetooth device by using a Bluetooth communication module. For example, referring to FIG. 10, the Bluetooth network further includes a third gateway 05, another link exists between the third gateway 05 and the first gateway 01, and a Bluetooth link exists between the third gateway 05 and the second Bluetooth device 04.

All or a part of the foregoing embodiments may be implemented by using software, hardware, firmware, or any combination thereof. When the software is used to implement embodiments, all or a part of the foregoing embodiments may be implemented in a form of a computer program product. The computer program product includes one or more computer instructions. When the computer program instructions are loaded or executed on a computer, all or a part of the processes or the functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website mobile terminal, computer, server, or data center to another website mobile terminal, computer, server, or data center in a wired (for example, a coaxial cable, an optical fiber, a twisted pair) or wireless (for example, infrared, microwave, or the like) manner. The computer-readable storage medium may be any medium accessible by a computer, or a data storage device, such as a server or a data center, including one or more medium collections. The medium may be a magnetic medium (for example, a floppy disk, a hard disk drive, or a magnetic tape), an optical medium (for example, an optical disc), or a semiconductor medium. The semiconductor medium may be a solid state drive (SSD).

The term "at least one" in this application means one or more, the term "a plurality of" in this application means two or more, and the terms "system" and "network" in this specification may be often used interchangeably. The term "and/or" mentioned in this specification represents that three relationships may exist. For example, A and/or B may represent the following three cases: Only A exists, both A and B exist, and only B exists. The character "/" generally indicates an "or" relationship between the associated objects.

The foregoing descriptions are merely optional embodiments of this application, but are not intended to limit this application. The protection scope of this application is subject to the claims.

What is claimed is:

1. A method, comprising:

receiving, on a first Bluetooth link between a first gateway and a first Bluetooth device, a first Bluetooth message sent by the first Bluetooth device;

encapsulating, using a transport protocol adapted to a non-Bluetooth link between the first gateway and a second gateway, the first Bluetooth message to obtain a second Bluetooth message; and sending the second Bluetooth message and a Bluetooth channel allocation instruction to the second gateway on the non-Bluetooth link, wherein the second gateway decapsulates the second Bluetooth message using the transport protocol to obtain the first Bluetooth message, and sends the first Bluetooth message to a second Bluetooth device on a second Bluetooth link with the second Bluetooth device, wherein the non-Bluetooth link is a wireless local area network link or a wired link, and the Bluetooth channel allocation instruction indicates to the second gateway which Bluetooth broadcast channel to use as a broadcast channel of the second gateway or which Bluetooth data channel to use as a data channel of the second gateway.

2. The method according to claim 1, wherein the method further comprises:

selecting a first Bluetooth broadcast channel as a Bluetooth broadcast channel of the first gateway; and selecting a first Bluetooth data channel as a Bluetooth data channel of the first gateway, wherein the Bluetooth channel allocation instruction indicates to the second gateway to use a second Bluetooth broadcast channel as the Bluetooth broadcast channel of the second gateway and to use a second Bluetooth data channel as the Bluetooth data channel of the second gateway.

3. The method according to claim 1, wherein the first Bluetooth message comprises service data.

4. The method according to claim 1, wherein the first Bluetooth message comprises first attribute information indicating that the first Bluetooth device supports transmission of a Bluetooth message on the non-Bluetooth link.

5. The method according to claim 1, wherein the method further comprises:

sending a first request to the first Bluetooth device at each connection interval on the first Bluetooth link, wherein the first request indicates to the first Bluetooth device to feed back a first response on the first Bluetooth link; and sending, to the second gateway at each connection interval on the non-Bluetooth link, a second request obtained through encapsulation by using the transport protocol, wherein the second request is sent to the second Bluetooth device on the second Bluetooth link after being decapsulated by the second gateway, and the second request indicates to the second Bluetooth device to feed back a second response on the second Bluetooth link.

6. The method according to claim 5, wherein:

the first Bluetooth message comprises second attribute information, and the second attribute information indicates that a Bluetooth device supports performing connection management on a Bluetooth connection on the non-Bluetooth link; and sending the first request to the first Bluetooth device at each connection interval on the first Bluetooth link comprises sending, to the first Bluetooth device based on an indication of the second attribute information in the first Bluetooth message, the first request at each connection interval on the first Bluetooth link.

7. The method of claim 6, further comprising:
receiving, on the non-Bluetooth link, a third Bluetooth message sent by the second gateway, wherein the third Bluetooth message is obtained by encapsulating, by the second gateway by using the transport protocol, a fourth Bluetooth message received on the second Bluetooth link, and the fourth Bluetooth message comprises the second attribute information; and
decapsulating, using the transport protocol, the third Bluetooth message to obtain the fourth Bluetooth message, wherein
sending, to the second gateway at each connection interval on the non-Bluetooth link, the second request obtained through encapsulation by using the transport protocol comprises:
sending, to the second gateway based on the indication of the second attribute information in the fourth Bluetooth message, at each connection interval on the non-Bluetooth link, the second request obtained through encapsulation by using the transport protocol.

8. The method according to claim 1, further comprising:
after a Bluetooth connection to the first Bluetooth device is established, obtaining a first Bluetooth signal strength between the first Bluetooth device and the first gateway and a second Bluetooth signal strength between the first Bluetooth device and the second gateway on the first Bluetooth link; and
sending a roaming instruction to the first Bluetooth device on the first Bluetooth link in response to the second Bluetooth signal strength being greater than the first Bluetooth signal strength, wherein the roaming instruction indicates to the first Bluetooth device to establish the Bluetooth connection to the second gateway.

9. The method according to claim 8, wherein:
the first Bluetooth message comprises third attribute information indicating that the first Bluetooth device supports roaming between different gateways; and
obtaining the first Bluetooth signal strength between the first Bluetooth device and the first gateway and the second Bluetooth signal strength between the first Bluetooth device and the second gateway on the first Bluetooth link after the Bluetooth connection to the first Bluetooth device is established comprises:
obtaining, based on an indication of the third attribute information in the first Bluetooth message, the first Bluetooth signal strength between the first Bluetooth device and the first gateway and the second Bluetooth signal strength between the first Bluetooth device and the second gateway on the first Bluetooth link after the Bluetooth connection to the first Bluetooth device is established.

10. The method of claim 1, wherein the steps of receiving, encapsulating, and sending are performed by the first gateway.

11. A method, comprising:
receiving, on a non-Bluetooth link with a first gateway, a second Bluetooth message sent by the first gateway, wherein the second Bluetooth message is obtained by encapsulating, by the first gateway by using a transport protocol adapted to the non-Bluetooth link, a first Bluetooth message received on a first Bluetooth link with a first Bluetooth device, wherein the non-Bluetooth link is a wireless local area network link or a wired link;
receiving, on the non-Bluetooth link, a Bluetooth channel allocation instruction sent by the first gateway, wherein the Bluetooth channel allocation instruction indicates which Bluetooth broadcast channel to use as a broadcast channel or which Bluetooth data channel to use as a data channel;
decapsulating, by using the transport protocol, the second Bluetooth message to obtain the first Bluetooth message; and
sending the first Bluetooth message to a second Bluetooth device on a second Bluetooth link with the second Bluetooth device.

12. The method according to claim 11, wherein the method further comprises:
using a second Bluetooth broadcast channel and a second Bluetooth data channel that are indicated in the Bluetooth channel allocation instruction as the Bluetooth broadcast channel and the Bluetooth data channel of a second gateway respectively.

13. The method according to claim 11, wherein the method further comprises:
receiving, on the second Bluetooth link, a fourth Bluetooth message sent by the second Bluetooth device;
encapsulating, using the transport protocol, the fourth Bluetooth message to obtain a third Bluetooth message; and
sending the third Bluetooth message to the first gateway on the non-Bluetooth link, wherein the first gateway decapsulates the third Bluetooth message by using the transport protocol, to obtain the fourth Bluetooth message, and sends the third Bluetooth message to the first Bluetooth device on the first Bluetooth link.

14. The method of claim 11, wherein the steps of receiving, decapsulating, and sending are performed by a second gateway different from the first gateway.

15. A gateway, comprising:
a processor; and
a memory coupled to the processor with a computer code stored thereon, the computer code containing instructions that, when executed by the processor, enables the processor to perform the method according to claim 11.

16. A gateway, comprising:
a processor; and
a memory coupled to the processor with a computer code stored thereon, the computer code containing instructions that, when executed by the processor, enables the processor to perform the following steps:
receiving, on a first Bluetooth link between a first gateway and a first Bluetooth device, a first Bluetooth message sent by the first Bluetooth device,
encapsulating, using a transport protocol adapted to a non-Bluetooth link between the first gateway and a second gateway, the first Bluetooth message to obtain a second Bluetooth message, and
sending the second Bluetooth message and a Bluetooth channel allocation instruction to the second gateway on the non-Bluetooth link, wherein the second gateway decapsulates the second Bluetooth message using the transport protocol to obtain the first Bluetooth message, and sends the first Bluetooth message to a second Bluetooth device on a second Bluetooth link with the second Bluetooth device, wherein the non-Bluetooth link is a wireless local area network link or a wired link, and the Bluetooth channel allocation instruction indicates to the second gateway which Bluetooth broadcast channel to use as a broadcast channel of the second gateway or which Bluetooth data channel to use as a data channel of the second gateway.

17. The gateway of claim 16, wherein the instructions, when executed by the processor, further enable the processor to perform the following steps:

selecting a first Bluetooth broadcast channel as a Bluetooth broadcast channel of the first gateway;

selecting a first Bluetooth data channel as a Bluetooth data channel of the first gateway; and sending a Bluetooth channel allocation instruction to the second gateway on the non-Bluetooth link, wherein the Bluetooth channel allocation instruction indicates to the second gateway to use a second Bluetooth broadcast channel as a Bluetooth broadcast channel of the second gateway and to use a second Bluetooth data channel as a Bluetooth data channel of the second gateway.

18. The gateway of claim 16, wherein the first Bluetooth message comprises service data.

19. The gateway of claim 16, wherein the first Bluetooth message comprises first attribute information indicating that the first Bluetooth device supports transmission of a Bluetooth message on the non-Bluetooth link.

20. The gateway of claim 16, wherein the gateway comprises the first gateway.

* * * * *